United States Patent
Pike et al.

(10) Patent No.: US 12,505,757 B2
(45) Date of Patent: *Dec. 23, 2025

(54) VIRTUAL REALITY TRAINING AND EVALUATION SYSTEM

(71) Applicant: PIKE ENTERPRISES, LLC, Mount Airy, NC (US)

(72) Inventors: J. Eric Pike, Lewisville, NC (US); Lamar Kearson, Savannah, GA (US)

(73) Assignee: PIKE ENTERPRISES, LLC, Mount Airy, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/768,980

(22) Filed: Jul. 10, 2024

(65) Prior Publication Data

US 2024/0363021 A1    Oct. 31, 2024

Related U.S. Application Data

(63) Continuation of application No. 16/451,730, filed on Jun. 25, 2019, now Pat. No. 12,106,676.
(Continued)

(51) Int. Cl.
*G09B 19/00* (2006.01)
*G06F 3/01* (2006.01)
(Continued)

(52) U.S. Cl.
CPC ............ *G09B 19/003* (2013.01); *G06F 3/011* (2013.01); *G06T 19/003* (2013.01); *G09B 5/02* (2013.01); *G06T 2200/04* (2013.01); *G09B 19/24* (2013.01)

(58) Field of Classification Search
CPC ........ G09B 19/003; G09B 5/02; G09B 19/24; G06F 3/011; G06T 19/003; G06T 2200/04
See application file for complete search history.

(56) References Cited

U.S. PATENT DOCUMENTS 9,384,675 B2 * 7/2016 Zboray ................. G09B 19/00
9,498,704 B1   11/2016 Cohen
(Continued)

FOREIGN PATENT DOCUMENTS

WO    2014140721 A1    9/2014
WO    2018104921 A1    6/2018

OTHER PUBLICATIONS

European Office Action, issued Feb. 1, 2024, in European Application No. 19740141.7-1218, 8 pages.
(Continued)

*Primary Examiner* — Xuan M Thai
*Assistant Examiner* — Sadaruz Zaman
(74) *Attorney, Agent, or Firm* — Moore & Van Allen PLLC

(57) ABSTRACT

A virtual reality training and evaluation system may comprise a visual display device, one or more user input devices, one or more computer processors, a memory, and a network communication device. Computer-executable instructions are stored in the memory and configured to cause the one or more computer processors to execute a virtual reality training program that simulates a virtual environment displayed on the visual display device. A user is typically prompted to complete a task within the virtual environment. The task may be an electrical, gas, or water construction, maintenance, or service task. User interactions with the virtual environment in order to complete the task are received via the one or more user input devices. The user's performance of the task (and related subtasks) is typically monitored and compared to defined evaluation criteria. Thereafter, the user may be provided with an evaluation.

20 Claims, 12 Drawing Sheets

Related U.S. Application Data

(60) Provisional application No. 62/689,487, filed on Jun. 25, 2018.

(51) Int. Cl.
    *G06T 19/00* (2011.01)
    *G09B 5/02* (2006.01)
    *G09B 19/24* (2006.01)

(56) References Cited

U.S. PATENT DOCUMENTS

| | | | |
|---|---|---|---|
| 10,242,501 B1* | 3/2019 | Pusch | H04N 19/43 |
| 10,388,176 B2 | 8/2019 | Wallace | |
| 10,657,839 B2* | 5/2020 | Becker | B23K 9/32 |
| 11,355,025 B2 | 6/2022 | Wallace | |
| 11,593,726 B2* | 2/2023 | Pike | G06N 20/00 |
| 12,106,676 B2* | 10/2024 | Pike | G09B 19/003 |
| 2003/0215779 A1 | 11/2003 | Dupont | |
| 2007/0048702 A1 | 3/2007 | Jang | |
| 2009/0325138 A1 | 12/2009 | Shuster | |
| 2010/0233667 A1 | 9/2010 | Wilson | |
| 2012/0264510 A1 | 10/2012 | Wigdor | |
| 2013/0323695 A1* | 12/2013 | Zboray | G09B 19/00 434/219 |
| 2014/0162224 A1 | 6/2014 | Wallace | |
| 2015/0310758 A1 | 10/2015 | Daddona | |
| 2016/0077547 A1* | 3/2016 | Aimone | A61B 3/113 345/8 |
| 2017/0148214 A1 | 5/2017 | Muniz-Simas | |
| 2017/0364832 A1* | 12/2017 | Habermehl | G06Q 10/101 |
| 2019/0199759 A1 | 6/2019 | Anderson | |
| 2019/0244427 A1 | 8/2019 | Sun | |
| 2019/0392728 A1 | 12/2019 | Pike | |
| 2020/0066049 A1 | 2/2020 | Sun | |
| 2021/0311320 A1* | 10/2021 | Pike | G06T 7/73 |
| 2022/0139254 A1 | 5/2022 | Ramani | |

OTHER PUBLICATIONS

Canadian Office Action, issued Nov. 2, 2023 in Canadian Application No. 3,103,277, 6 pages.
Canadian Office Action, issued Jan. 26, 2023 in Canadian Application No. 3,103,277, 4 pages.
European Article 94(3) Communication, issued Jun. 7, 2022 in European Application No. 19740141.7, 9 pages.
Mexican Office Action, issued Oct. 2, 2024 in Mexican Application No. MX/a/2021/000176, 7 pages.
U.S. Appl. No. 16/451,730, filed Jun. 25, 2019.
Mexican Office Action, issued Mar. 19, 2025, in Mexican Application No. MX/a/2021/000176, 16 pages.
Mexican Office Action, issued Jul. 30, 2025, in Mexican Application No. MX/a/2021/000176, 29 pages.
European Office Action, issued Oct. 14, 2025, in European Application No. 19740141.7-1218, 9 pages.

* cited by examiner

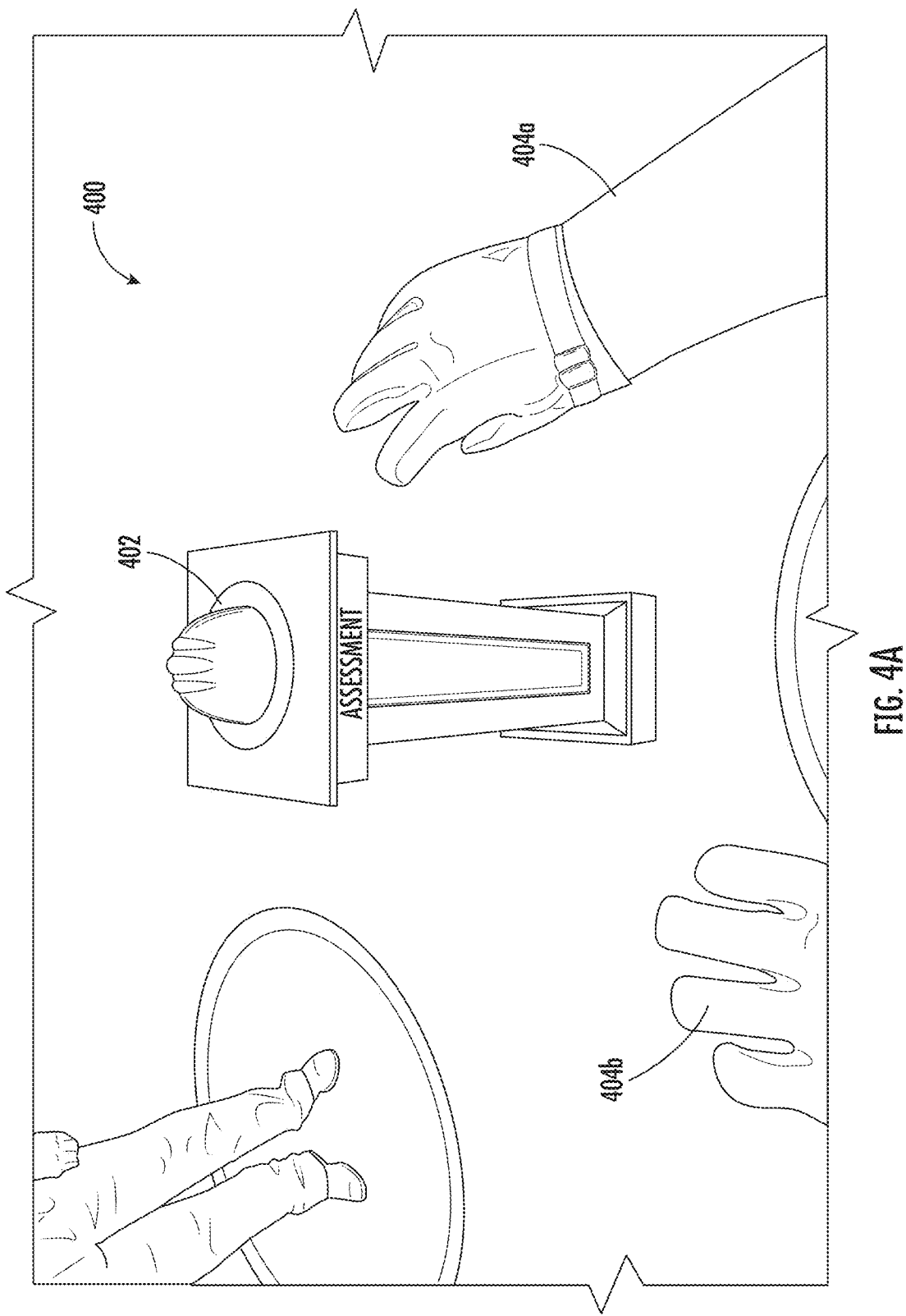

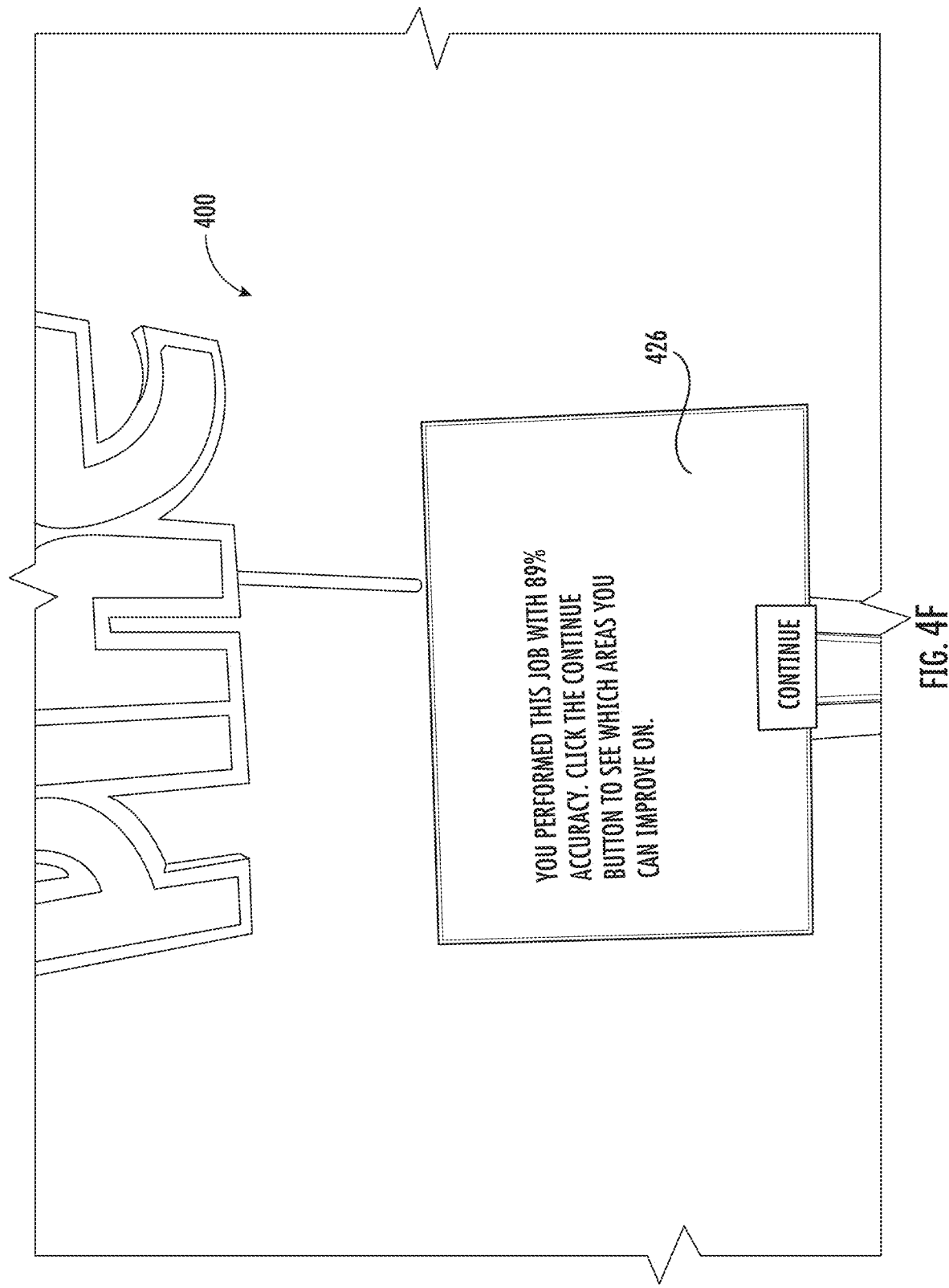

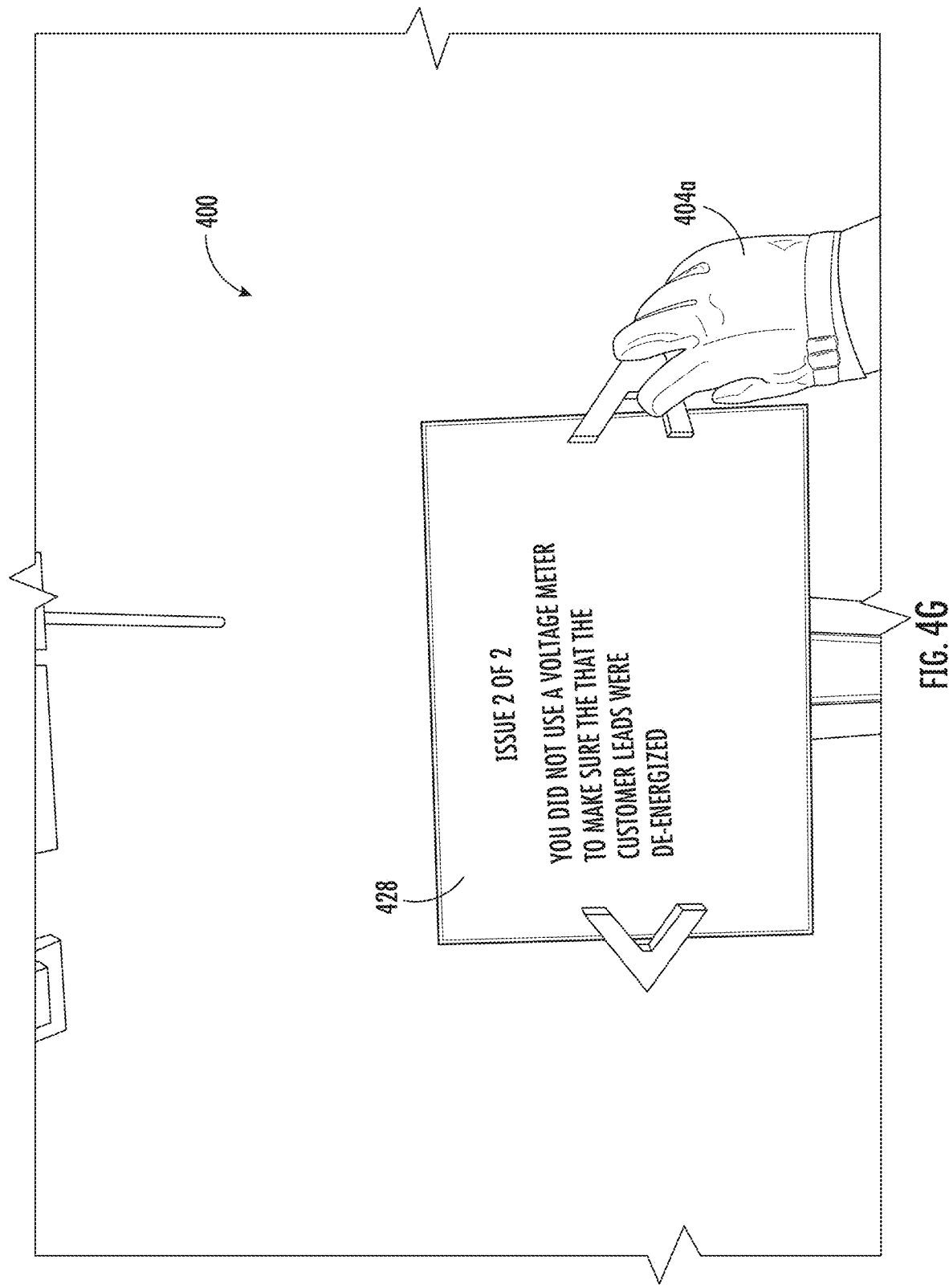

VIRTUAL REALITY TRAINING AND EVALUATION SYSTEM

CROSS-REFERENCE TO RELATED APPLICATION

This application is a continuation of U.S. patent application Ser. No. 16/451,730, filed Jun. 25, 2019, now published as U.S. Patent Application Publication No. 2019/0392728, which claims the benefit of U.S. Provisional Application No. 62/689,487 filed Jun. 25, 2018, the contents of each of which are hereby incorporated by reference herein in their entirety.

BACKGROUND

Firsthand experience, continued training, and proper certification are important for skilled workers in hazardous occupational fields (e.g., electrical line work, construction, and the like). However, in order to provide a safe instructional environment, current methods of computer-based training lack the immersive qualities found only in a hands-on experience. As a result, there exists a need for an improved training and evaluation system.

SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

A virtual reality training and evaluation system is provided. The system comprises a visual display device, one or more user input devices, one or more computer processors, a memory, and a network communication device. Computer-executable instructions stored in the memory, executable by the one or more computer processors, and are configured to cause the one or more computer processors to perform the steps of: executing a virtual reality training module, wherein the virtual reality training module is configured to simulate a virtual environment, wherein simulating the virtual environment comprises displaying at least a portion of the virtual environment on the visual display device and receiving a user's interactions with the virtual environment via the one or more user input devices; during execution of the virtual reality training module, prompting the user to perform a task in the virtual environment; during performance of the task, monitoring the user's interactions with the virtual environment; comparing the user's interactions with predefined safety criteria; and based on comparing the user's interactions with the predefined safety criteria, providing the user with a safety evaluation.

In a specific embodiment, the computer-executable instructions are configured to cause the one or more computer processors to perform the steps of: based on monitoring the user interactions with the virtual environment, comparing the user interactions with predefined efficiency criteria; and based on comparing the user interactions with the predefined efficiency criteria, providing the user with an efficiency evaluation. In another embodiment, monitoring the user interactions with the virtual environment comprises recording event data for a plurality of user interaction events; and the efficiency evaluation is further based on an order and timing of the user interaction events.

In yet another embodiment, the computer-executable instructions are configured to cause the one or more computer processors to perform the steps of: based on monitoring the user interactions with the virtual environment, comparing the user interactions with predefined step-process criteria; and based on comparing the user interactions with the predefined step-process criteria, providing the user with a step-process evaluation. In yet another embodiment, monitoring the user interactions with the virtual environment comprises recording event data for a plurality of user interaction events; and the step-process evaluation is further based on an order of the user interaction events.

In yet another embodiment, comparing the user interactions with predefined safety criteria comprises determining whether the user has completed one or more predefined subtasks associated with the task. In yet another embodiment, comparing the user interactions with predefined safety criteria comprises determining that the user has not completed a first subtask associated with the task in accordance with the safety criteria, and wherein providing the user with the safety evaluation comprises notifying the user that the first subtask was not completed in accordance with the safety criteria.

In yet another embodiment, the virtual environment is a virtual hazardous environment. In yet another embodiment, the task is an electrical, gas, or water construction, maintenance, or service task. In yet another embodiment, the virtual environment is a virtual electrical line working environment, and the task is an electrical line working task.

In yet another embodiment, the user is a first user, and the virtual environment is a shared virtual environment further comprising a second user, wherein the computer-executable instructions are configured to cause the one or more computer processors to perform the steps of: displaying the shared virtual environment to the first user and the second user; simultaneously monitoring interactions of the first user and the second user with the shared virtual environment; and comparing the interactions of the first user and the second user with the predefined safety criteria. In yet another embodiment, the second user is a qualified observer for the first user.

A computer-implemented method for virtual reality training and evaluation is also provided. The computer-implemented method comprises the steps of: executing a virtual reality training module, wherein the virtual reality training module is configured to simulate a virtual environment, wherein simulating the virtual environment comprises displaying at least a portion of the virtual environment on a visual display device and receiving user interactions with the virtual environment via one or more user input devices; during execution of the virtual reality training module, prompting a user to perform a task in the virtual environment; during performance of the task, monitoring the user interactions with the virtual environment; comparing the user interactions with predefined safety criteria; and based on comparing the user interactions with the predefined safety criteria, providing the user with a safety evaluation.

In a specific embodiment, the computer-implemented method further comprises the steps of: based on monitoring the user interactions with the virtual environment, comparing the user interactions with predefined efficiency criteria; and based on comparing the user interactions with the predefined efficiency criteria, providing the user with an efficiency evaluation. In another embodiment, monitoring the user interactions with the virtual environment comprises recording event data for a plurality of user interaction events; and the efficiency evaluation is further based on an order and timing of the user interaction events.

In yet another embodiment, the computer-implemented method further comprises the steps of: based on monitoring the user interactions with the virtual environment, comparing the user interactions with predefined step-process criteria; and based on comparing the user interactions with the predefined step-process criteria, providing the user with a step-process evaluation. In yet another embodiment, monitoring the user interactions with the virtual environment comprises recording event data for a plurality of user interaction events; and the step-process evaluation is further based on an order of the user interaction events.

In yet another embodiment, the virtual environment is a virtual electrical line working environment, and the task is an electrical line working task.

In yet another embodiment, the user is a first user, and the virtual environment is a shared virtual environment further comprising a second user, the computer-implemented method further comprising the steps of: displaying the shared virtual environment to the first user and the second user; simultaneously monitoring interactions of the first user and the second user with the shared virtual environment; and comparing the interactions of the first user and the second user with the predefined safety criteria.

A computer program product for virtual reality training and evaluation is also provided. The computer program product comprises a non-transitory computer-readable medium comprising computer-readable instructions, the computer-readable instructions, when executed by a processing device, cause the processing device to perform the steps of: executing a virtual reality training module, wherein the virtual reality training module is configured to simulate a virtual environment, wherein simulating the virtual environment comprises displaying at least a portion of the virtual environment on a visual display device and receiving user interactions with the virtual environment via one or more user input devices; during execution of the virtual reality training module, prompting a user to perform a task in the virtual environment; during performance of the task, monitoring the user interactions with the virtual environment; comparing the user interactions with predefined safety criteria; and based on comparing the user interactions with the predefined safety criteria, providing the user with a safety evaluation.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
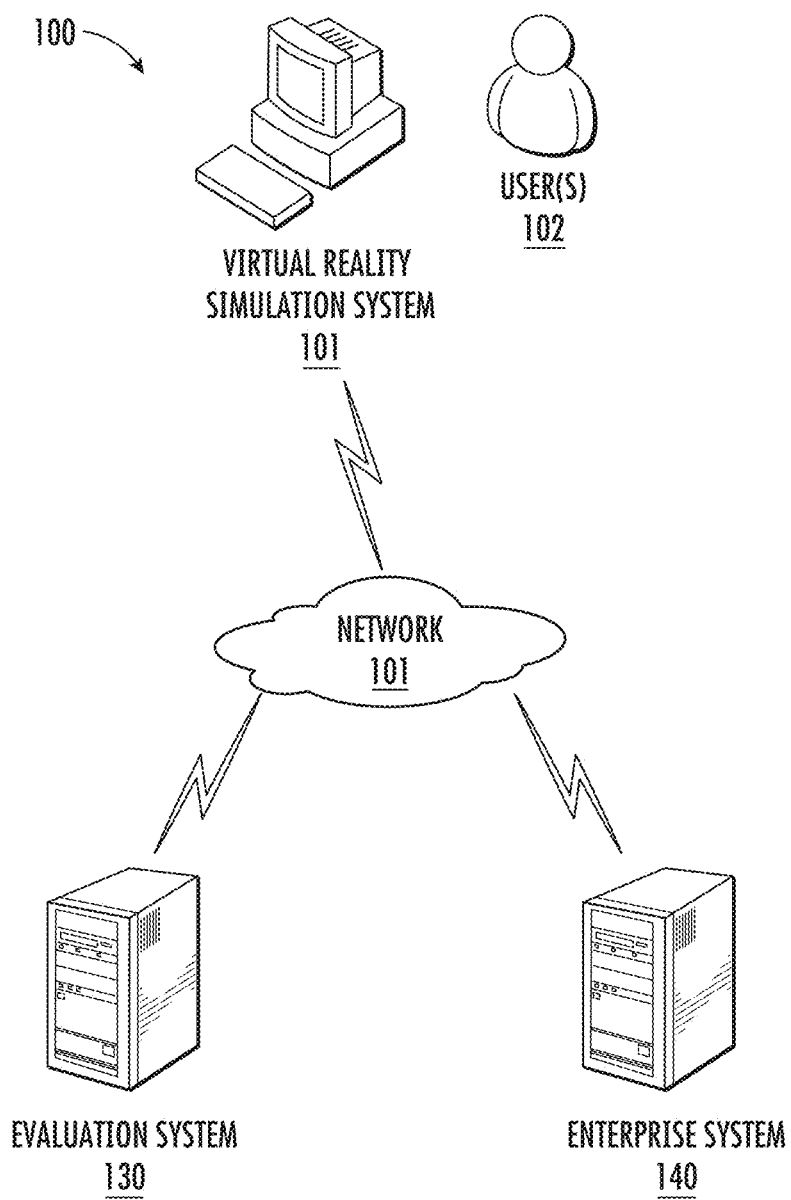
Figure 2:
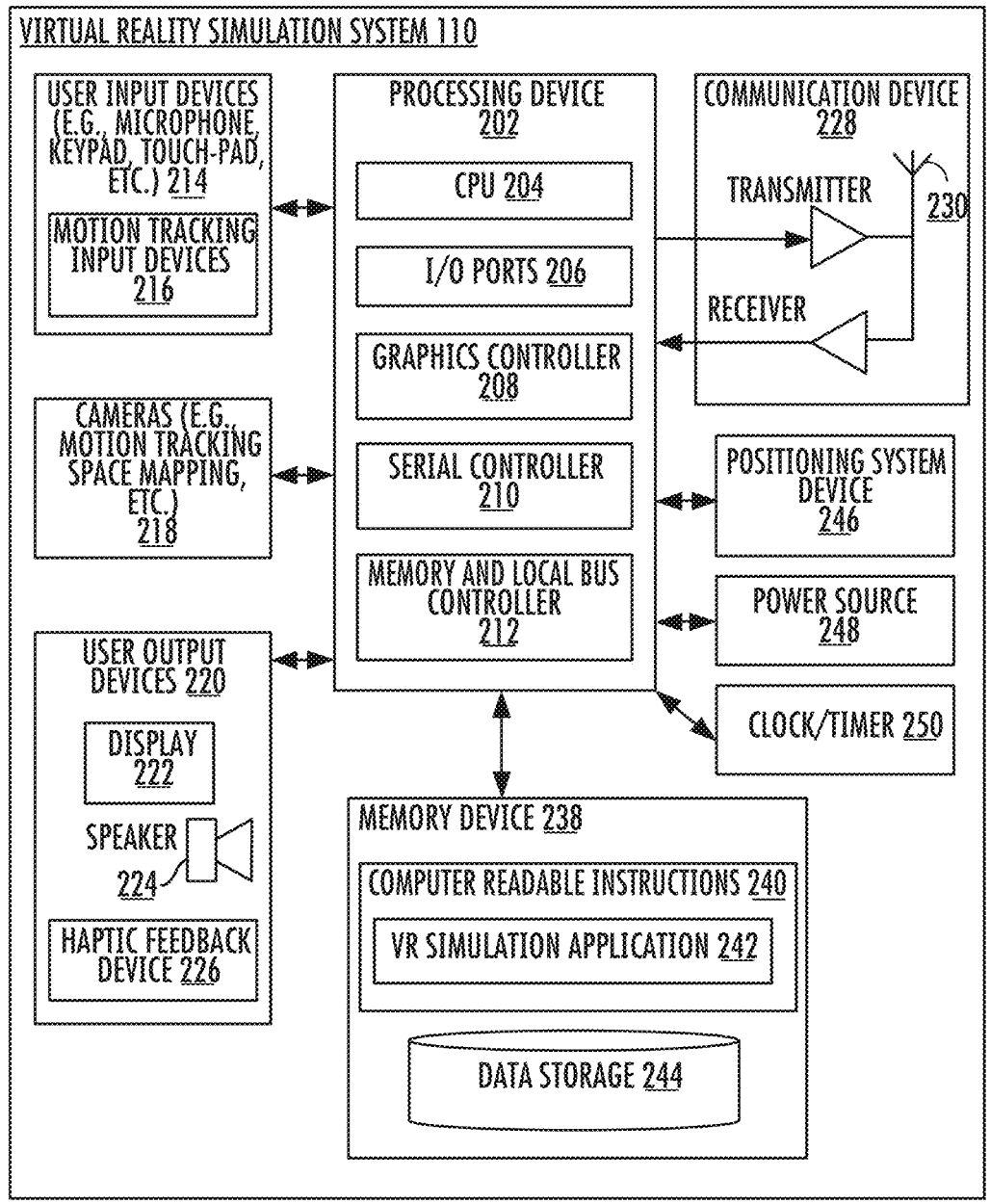
Figure 3:
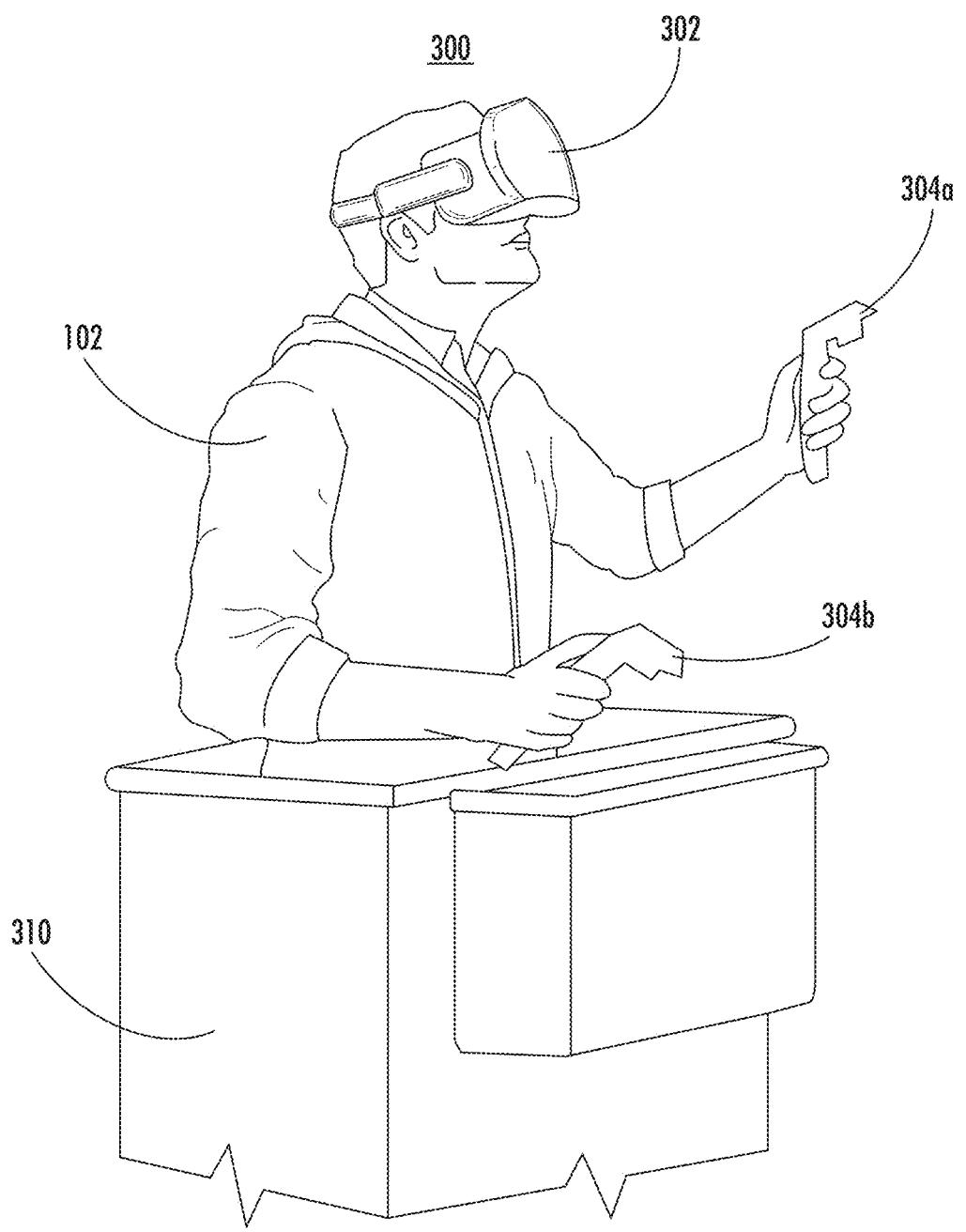
Figure 5:
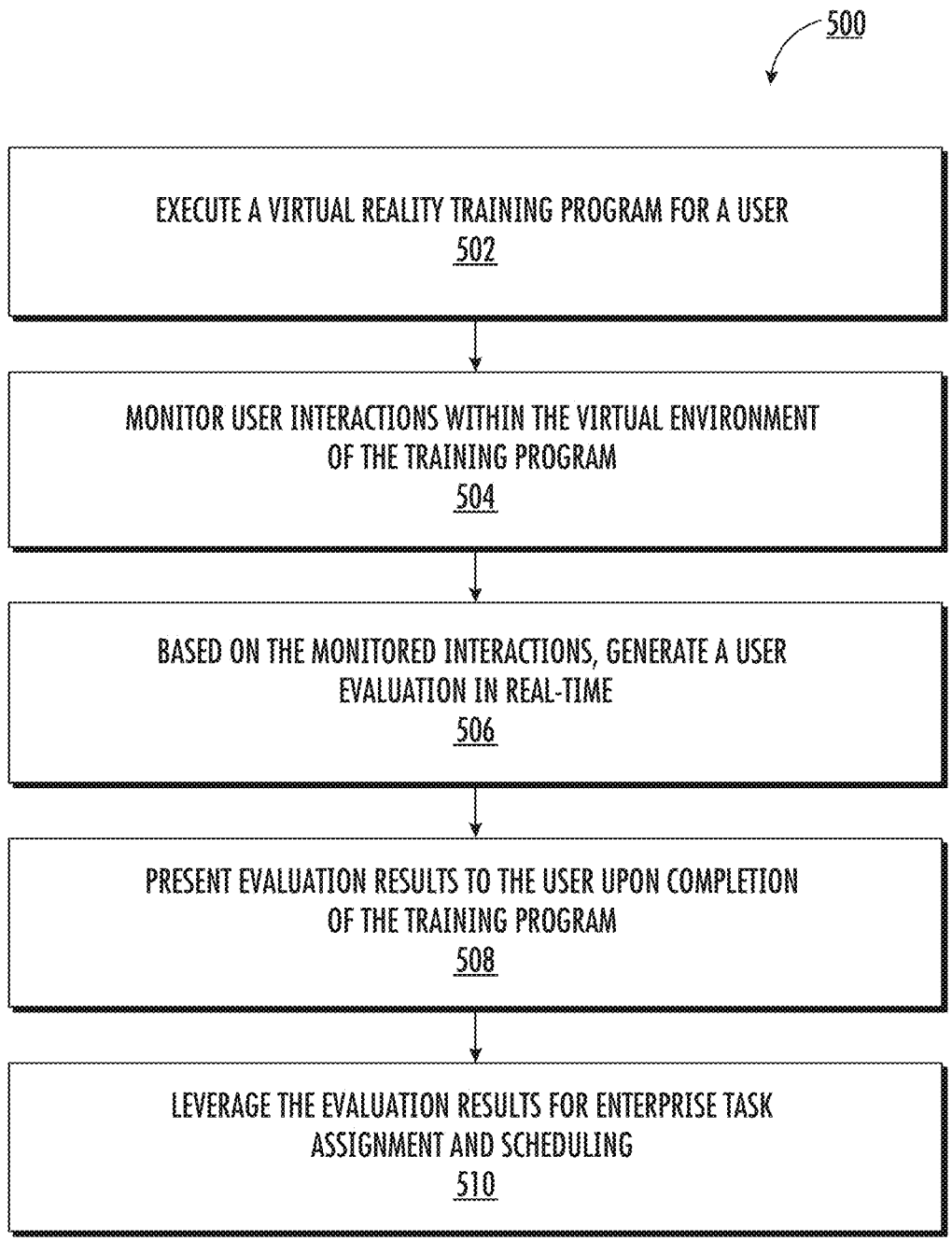
Figure 6:
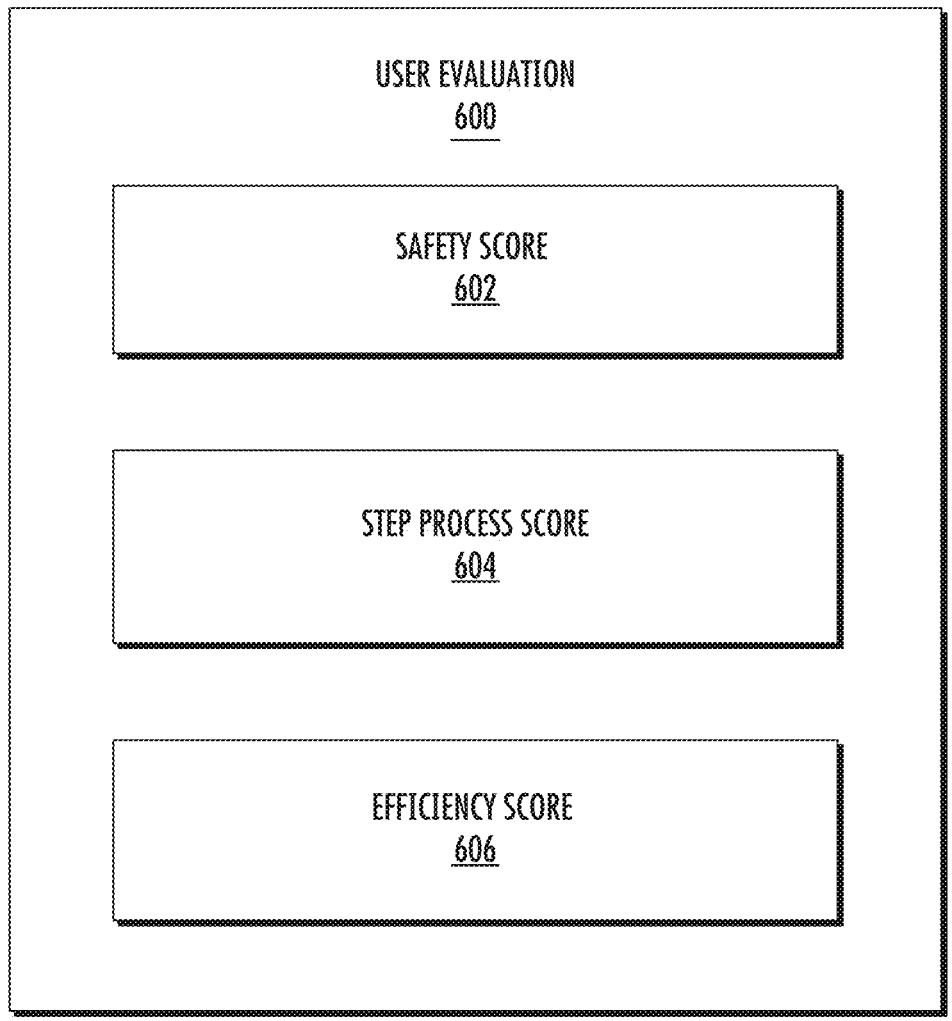

Having thus described embodiments of the invention in general terms, reference will now be made to the accompanying drawings, wherein:

FIG. 1 provides a virtual reality training and evaluation system environment, in accordance with one embodiment of the invention;

FIG. 2 provides a block diagram of a virtual reality simulation system, in accordance with one embodiment of the invention;

FIG. 3 illustrates user operation of a virtual reality simulation system, in accordance with one embodiment of the invention;

FIG. 4A-4G provide screenshots of a virtual reality working environment, in accordance with one embodiment of the invention;

FIG. 5 provides a high level process map for virtual reality training and evaluation, in accordance with one embodiment of the invention; and FIG. 6 provides a block diagram illustrating evaluation scoring elements, in accordance with one embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein the term "virtual reality" may refer to a computer-rendered simulation or an artificial representation of a three-dimensional image or environment that can be interacted with in a seemingly real or physical way by a person using special electronic equipment or devices, such as the devices described herein. In a specific example, a virtual environment may be rendered that simulates a hazardous working environment or hazardous materials and/or equipment (e.g., electric line work, construction, or the like).

As used herein, the term "user" may refer to any individual or entity (e.g., a business) associated with the virtual reality training and evaluation system. In one embodiment, a user may refer to an operator or wearer of a virtual reality device that is either conducting and/or performing a training and evaluation exercise. In some embodiments, a user may refer to an individual or entity associated with another device operably coupled to the virtual reality device or system. For example, the user may be a computing device user, a phone user, a mobile device application user, a training instructor, a system operator, a support technician, an employee of an entity or the like. In some embodiments, identities of an individual may include online handles, usernames, identification numbers (e.g., Internet protocol (IP) addresses), aliases, or the like. A user may be required to authenticate an identity of the user by providing authentication information or credentials (e.g., a password) in order to interact and be monitored by one or more of the systems described herein (i.e., log on)

As used herein the term "computing device" may refer to any device that employs a processor and memory and can perform computing functions, such as a personal computer, a mobile device, an Internet accessing device, or the like. In one embodiment, a computing device may include a virtual reality device such as a device comprising a head-mounted display and one or more additional user input devices.

As used herein, the term "computing resource" may refer to elements of one or more computing devices, networks, or the like available to be used in the execution of tasks or processes such as rendering a virtual reality environment and executing a training simulation. A computing resource may include processor, memory, network bandwidth and/or power used for the execution of tasks or processes. A computing resource may be used to refer to available processing, memory, and/or network bandwidth and/or power of an individual computing device as well as a plurality of computing devices that may operate as a collective for the execution of one or more tasks. For example, in one embodiment, a virtual reality device may include dedicated computing resources (e.g., a secondary or on-board processor) for rendering a virtual environment or supplementing the computing resources of another computing device used to render the virtual environment.

To "monitor" is to watch, observe, or check something for a special purpose over a period of time. The "monitoring" may occur periodically over the period of time, or the monitoring may occur continuously over the period of time. In some embodiments, a system may actively monitor user interactions with the system via an interface such as though a computer application and/or via input devices (e.g., keyboard, mouse, and other peripheral devices). In one embodiment, a system may monitor user interactions with a virtual reality environment and objects populated within the environment. For example, a system may monitor the progress of a user completing a virtual reality training program, wherein a series of user interactions with a virtual reality environment and the objects located therein are tracked by the system.

In one aspect, embodiments of the invention are directed to a virtual reality training and evaluation system that provides an innovative tool for the safe instruction and assessment of users working in various fields, particularly in hazardous occupational fields such as construction, electrical line work, and the like. The system typically renders a virtual environment and prompts the user to perform a task related to their occupation in the virtual environment. In exemplary embodiments, the task is an electrical, gas, or water construction, maintenance, or service task. By way of a particular example, such task may be a particular type of activity performed in the field of line work, and the virtual environment may simulate a physical line working environment. Performance of the task typically involves completion of a number of subtasks. To complete the task (including related subtasks), the user typically interacts with the virtual environment via a head-mounted display and one or more handheld motion tracking input controllers.

The system typically monitors the user's actions in real-time within the virtual environment while the user is completing the assigned task and related subtasks. An evaluation system compares the user's actions to defined criteria to quantify and evaluate the safety, step-process accuracy, and efficiency of the completed tasks by the user. Monitoring the user's interactions within the virtual environment allows for in-depth scoring and analysis to provide a comprehensive view of a user's performance that can be used to identify specific skills or gaps in knowledge that may require improvement or additional training. For example, a user's overall evaluation score may be broken down into individual steps or time intervals that may be individually assessed. Furthermore, more-important subtasks or actions may be given higher score weighting than less-important subtasks in order to emphasize the importance or the potentially hazardous nature of certain subtasks. Scores may be generated in real-time during a training simulation and provided to a user upon completion based on the user's actions. In some embodiments, user evaluation information is collected and stored in a database which generates an aggregated view of a user base and further provides a tool for searching and comparing the user information. In one embodiment, user scores may be compared to one another based on, for example, a type of work performed, geographic locations of the users, accreditation level of the users, and the like.

In a specific example, a user may utilize the virtual reality simulation system to perform a training simulation related to an electrical, gas, or water construction, maintenance, or service task, such as replacement of a transformer bank. The user may select the transformer bank replacement training experience within the virtual environment and then perform a series of subtasks (e.g., actions) that relate to complete of this task (i.e., transformer bank replacement). The user's interactions with the virtual environment are received via user input devices and progress is monitored recorded by the evaluation system and compared to scoring criteria related to proper execution of the task and subtasks. The user completes the experience by either completing the task associated with the experience (i.e., replacement of the transformer bank) or executing a critical error (e.g., touching an uninsulated conductor) that triggers failure. Upon completion of the experience, the system may immediately present the user with a safety score based on the extent of the user's execution of the task and subtasks complied with defined safety criteria. Further, a total time taken by the user to complete the task as well as times required by the user to complete individual subtasks during the training simulation may be compared to predefined time limits and/or the times of other users to further evaluate and score the user.

FIG. 1 provides a virtual reality training and evaluation system environment 100, in accordance with one embodiment of the invention. The system environment 100 generally comprises a virtual reality simulation system 110, an evaluation system 130, and an enterprise system 140. The virtual reality (VR) simulation system 110 typically renders and/or displays a virtual environment for the user 102 and provides an interface for the user to interact with the rendered environment. The evaluation system 130 typically monitors user 102 actions within the virtual environment and collects performance data during use of the VR simulation system 110 in order to evaluate performance of the user 102 during a training program (e.g., in real time). The enterprise system 140 may utilize data produced and stored by the VR simulation system 110 and/or the evaluation system 130 to schedule and assign workforce resources (i.e., personnel and equipment) to actual tasks as discussed herein. Although the VR simulation system 110, the evaluation system 130, and the enterprise system 140 are depicted as separate systems, it should be understood that the VR simulation system 110, the evaluation system 130, and the enterprise system 140 may be embodied as a single system or may combined into one or more systems that are configured to perform or share one or more of the functions described herein.

As illustrated in FIG. 1, a VR simulation system 110 may be operatively coupled, via a network 101, to at least one evaluation system 130 and at least one enterprise system 140. In this way, the VR simulation system 110 can send information to and receive information from the evaluation system 130 and the enterprise system 140. FIG. 1 illustrates only one example of an embodiment of the system environment 100. It should be understood in other embodiments, one or more of systems, devices, servers, or the like described herein may be combined into a single system, device, or server, or be made up of multiple systems, devices, or servers while still functioning in the same or similar way as the embodiments described herein.

The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101. In some embodiments, one or more of the systems and devices described herein may be hardwired directly together without or in addition to the support of the network 101 connection.

FIG. 2 provides a block diagram of the VR simulation system 110, in accordance with one embodiment of the invention. The VR simulation system 110 generally includes a processing device or processor 202 communicably coupled to devices such as, a memory device 238, user output devices 220, user input devices 214, a communication device or network interface device 228, a power source 248, a clock or other timer 250, a visual capture device such as a camera 218, a positioning system device 246. The processing device 202 may further include a central processing unit 204, input/output (I/O) port controllers 206, a graphics controller or GPU 208, a serial bus controller 210 and a memory and local bus controller 212.

The processing device 202 may be configured to use the communication device 228 to communicate with one or more other devices on the network 101, such as, but not limited to the evaluation system 130 and the enterprise system 140. Accordingly, the communication device 228 may include a network communication interface. The VR simulation system 110 may also be configured to operate in accordance with Bluetooth® or other communication/data networks via a wireless transmission device 230 (e.g., in order to communicate with user input devices 214 and user output devices 220). In another embodiment, the VR simulation system 110 may be hardwired to one or more other systems as discussed herein, wherein data and information is transmitted directly between the systems or devices over a cabled connection.

The processing device 202 may further include functionality to operate one or more software programs or applications, which may be stored in the memory device 238. The VR simulation system 110 comprises computer-readable instructions 240 and data storage 244 stored in the memory device 238, which in one embodiment includes the computer-readable instructions 240 of a VR simulation application 242. In some embodiments, the VR simulation application 242 provides one or more virtual reality environments, objects, training programs, evaluation courses, or the like to be executed by the VR simulation system 110 to present to the user 102. The VR simulation system 110 may further include a memory buffer, cache memory or temporary memory device operatively coupled to the processing device 202. Typically, one or more applications (e.g., VR simulation application 242), are loaded into the temporary memory during use. As used herein, memory may include any computer readable medium configured to store data, code, or other information. The memory device 238 may include volatile memory, such as volatile Random Access Memory (RAM) including a cache area for the temporary storage of data. The memory device 238 may also include non-volatile memory, which can be embedded and/or may be removable. The non-volatile memory may additionally or alternatively include an electrically erasable programmable read-only memory (EEPROM), flash memory or the like.

The user input devices 214 and the user output devices 220 allow for interaction between the user 102 and the VR simulation system 110. The user input devices 214 provide an interface to the user 102 for interacting with the VR simulation system 110 and specifically a virtual environment displayed or rendered by the VR simulation system 110. As illustrated in FIG. 2, the user input devices 214 may include a microphone, keypad, touchpad, touch screen, and the like. In one embodiment, the user input devices 214 include one or more motion tracking input devices 216 used to track movement and position of the user 102 within a space. The motion tracking input devices 216 may include one or more handheld controllers or devices (e.g., wands, gloves, apparel, and the like) that, upon interaction with the user 102, translate the user's 102 actual movements and position into the simulated virtual reality environment. In specific examples, movement and positioning of the user 102 within an actual space can be captured using accelerometers, a geo-positioning system (GPS), or the like. Furthermore, an actual space and motion tracking of the user 102 and/or objects within the actual space can be captured using motion tracking cameras or the like which may be configured to map the dimensions and contents of the actual space in order to simulate the virtual environment relative to the actual space.

The user output devices 220 allow for the user 102 to receive feedback from the virtual reality simulation system 110. As illustrated in FIG. 2, the user output devices include a user visual display device 222, a speaker 224, and a haptic feedback device 226. In one embodiment, haptic feedback devices 226 may be integrated into the motion tracking input devices 216 (e.g., controllers) in order to provide a tactile response to the user 102 while the user 102 is manipulating the virtual environment with the input devices 216.

The user display device 222 may include one or more displays used to present to the user 102 a rendered virtual environment or simulation. In a specific embodiment, the user display device 222 is a head-mounted display (HMD) comprising one or more display screens (i.e., monocular or binocular) used to project images to the user to simulate a 3D environment or objects. In an alternative embodiment, the user display device 222 is not head-mounted and may be embodied as one or more displays or monitors with which the user 102 observes and interacts. In some embodiments, the user output devices 220 may include both a head-mounted display (HMD) that can be worn by a first user and a monitor that can be concurrently viewed by a second user (e.g., an individual monitoring the first user's interactions with a virtual environment). In some embodiments, output from both the HMD and/or the monitor viewed by an observer may be stored in a database for analysis by the evaluation system 130.

In an alternative embodiment, the virtual reality simulation system may be configured to utilize more than one processing device. In one specific example the VR simulation system 110 may have a first dedicated processing device (e.g., integrated into a HMD) while simultaneously leveraging a second processing device or other computing resources from a second device (e.g., another user computing device (i.e., a desktop computer) or the like). In this way, the VR simulation system 110 may operate on consumer-level hardware. In another embodiment, the VR simulation system 110 does not leverage computing resources of a second device, wherein computer hardware components of the VR simulation system 110 are contained within a dedicated device (e.g., an all-in-one HMD virtual reality device) allowing for operation independent of additional hardware (e.g., a desktop computer).

As noted above, the virtual reality training and evaluation system environment 100 (as illustrated in FIG. 1) further includes one or more evaluation systems 130 and one or more enterprise systems 140, which may be operably coupled with the VR simulation system 110 and which may be associated with the user, other users, or entities. The evaluation systems 130 and the enterprise systems 140 both generally comprise a communication device, a processing device, and a memory device. In some embodiments, the evaluation systems 130 comprises computer-readable instructions stored in the memory device, which in one embodiment includes the computer-readable instructions of an evaluation application configured to monitor and evaluate performance of the user 102 within the virtual environment during a training program. In some embodiments, the enterprise system 140 comprises computer-readable instructions stored in an associated memory device, which in one embodiment includes the computer readable instructions of an enterprise application configured to schedule and assign workforce resources (i.e., personnel and equipment) to tasks as discussed herein.

FIG. 3 illustrates user operation of a virtual reality simulation system 300, in accordance with one embodiment of the invention. As illustrated in FIG. 3, the virtual reality simulation system 300 may include a HMD virtual reality device 302 worn on the head of a user 102 interacting with a virtual environment. The VR simulation system 300 may further include first 304a and a second 304b motion tracking input devices embodied as handheld controllers held by the user 102. As previously discussed, the first 304a and second 304b motion tracking input devices are typically configured to receive the user's 102 actual movements and position in an actual space and translate the movements and position into a simulated virtual reality environment. In one embodiment, the first 304a and second 304b controllers track movement and position of the user 102 (e.g., the user's hands) over six degrees of freedom in three dimensional space. The controllers 304a, 304b may further include additional input interfaces (i.e., buttons, triggers, touch pads, and the like) on the controllers 304a, 304b allowing for further interface with the user 102 and interaction with the virtual environment. In some embodiments, the HMD 302 further comprises a camera, accelerometer or the like for tracking motion and position of the user's 102 head in order to translate the motion and position within the virtual environment. In one embodiment, the virtual reality simulation system 300 may include an HTC Vive™ virtual reality system, an Oculus Rift™ virtual reality system, or other similar virtual reality systems. In another embodiment, the virtual reality simulation system 300 may comprise an all-in-one HMD virtual reality device such as an Oculus Quest™ virtual reality system, an HTC Vive Focus™ virtual reality system, or other similar virtual reality systems.

Virtual reality environments are typically designed or generated to present particular experiences (e.g., training programs) to users. Typically, a VR environment is designed on a computing device (e.g., a desktop computer) and populated with various additional scenery and objects (e.g., tools) in order to simulate an actual environment in the virtual reality space. In an experience such as a training program, generating the VR environment may further include defining interactions between objects within the environment and/or allowed interactions between objects and the user. Additionally, one or more tasks and/or subtasks are typically defined within the environment to generate an experience which the user may complete. In a specific example, wherein a VR experience is a VR training program, one or more evaluation criteria may be defined within the experience and the VR environment (e.g., safety criteria, step-process criteria, efficiency criteria, and the like). Evaluation criteria may be defined by a user or entity (e.g., a business, organization, regulating body (e.g., OSHA), or the like) associated with generating the VR environment and experience based on the user's or entity's experiential knowledge of the actual environment and tasks being simulated. In some embodiments, evaluation criteria may be temporal, wherein tasks and subtasks may be required to be completed within a predetermined amount of time.

Specific configurations of a VR environment, objects within the environment, defined interactions, and/or tasks and subtasks, and defined evaluation criteria may be generated and stored as a specific experience that may be initiated and rendered at a later time. In some embodiments, a stored experience may be initiated through the VR application 242 and displayed on the VR simulation system 300 and presented to the user.

In a specific example discussed in the following figures, a VR experience may be embodied as a training program related to electrical, gas, or water construction, maintenance, and/or service, such as electrical line work. Within the training program, a virtual environment may be rendered to simulate, for example, replacement of a transformer bank. In some embodiments, such as the embodiment illustrated in FIG. 3, the VR simulation system 300 may further include a replica bucket 310 to simulate the experience of a user 102 working in a bucket truck commonly used in electrical line work. The replica bucket 310 in combination with the virtual reality environment provides a unique, augmented reality experience and closely simulates the sensation of a realistic line work environment to the user 102. Further, the bucket 310 provides a specialized workstation for the user to perform virtual reality training. In some embodiments, the controllers 304a, 304b are operatively coupled to and removable from a portion of the bucket 310 so as to simulate one or more tools or work implements with which the user 102 may interact while in the virtual environment. In some embodiments, the VR simulation system 300 may be configured to simulate electrical line work outside of the bucket such as on or below the surface of the ground. It should be understood that while an electrical line working environment is simulated in the illustrated embodiments, the VR simulation system 300 could be configured to simulate other potentially non-hazardous or hazardous working environments (e.g., construction, mining, and the like) or other experiences.

FIGS. 4A-4G provide screenshots of a virtual reality environment and simulated training experience, in accordance with one embodiment of the invention. Specifically, FIGS. 4A-4G depict an electrical line work training experience directed towards the replacement of a transformer bank. In some embodiments, upon placing the HMD 302 on the user's head and initiating a VR program, the system may present an initial VR environment 400 or main menu, wherein the user may select one or more preconfigured experiences to complete. Controllers 304a and 304b may be depicted within the virtual environment as virtual representations of user's hands 404a and 404b, respectively, wherein the user may move and provide input to the controllers 304a, 304b to interact with the virtual environment. In the illustrated embodiment of FIG. 4A, the user is presented with the option of an assessment or training experience related to electrical line work which is presented to the user as a hardhat 402. The user may interact with the hardhat and simulate holding and placing the hardhat on the user's head to initiate the training experience.

Figure 4B:
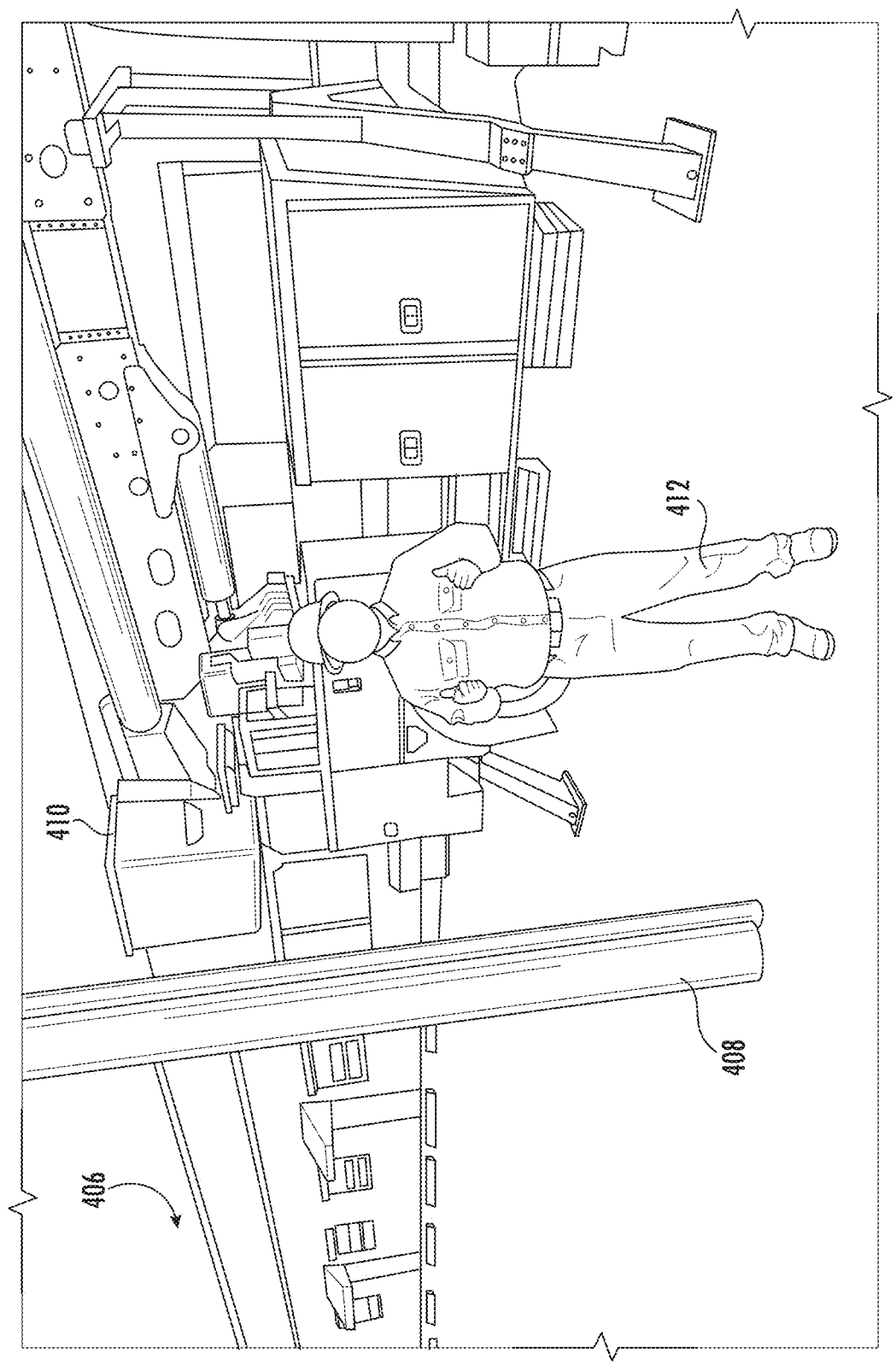
Figure 4C:
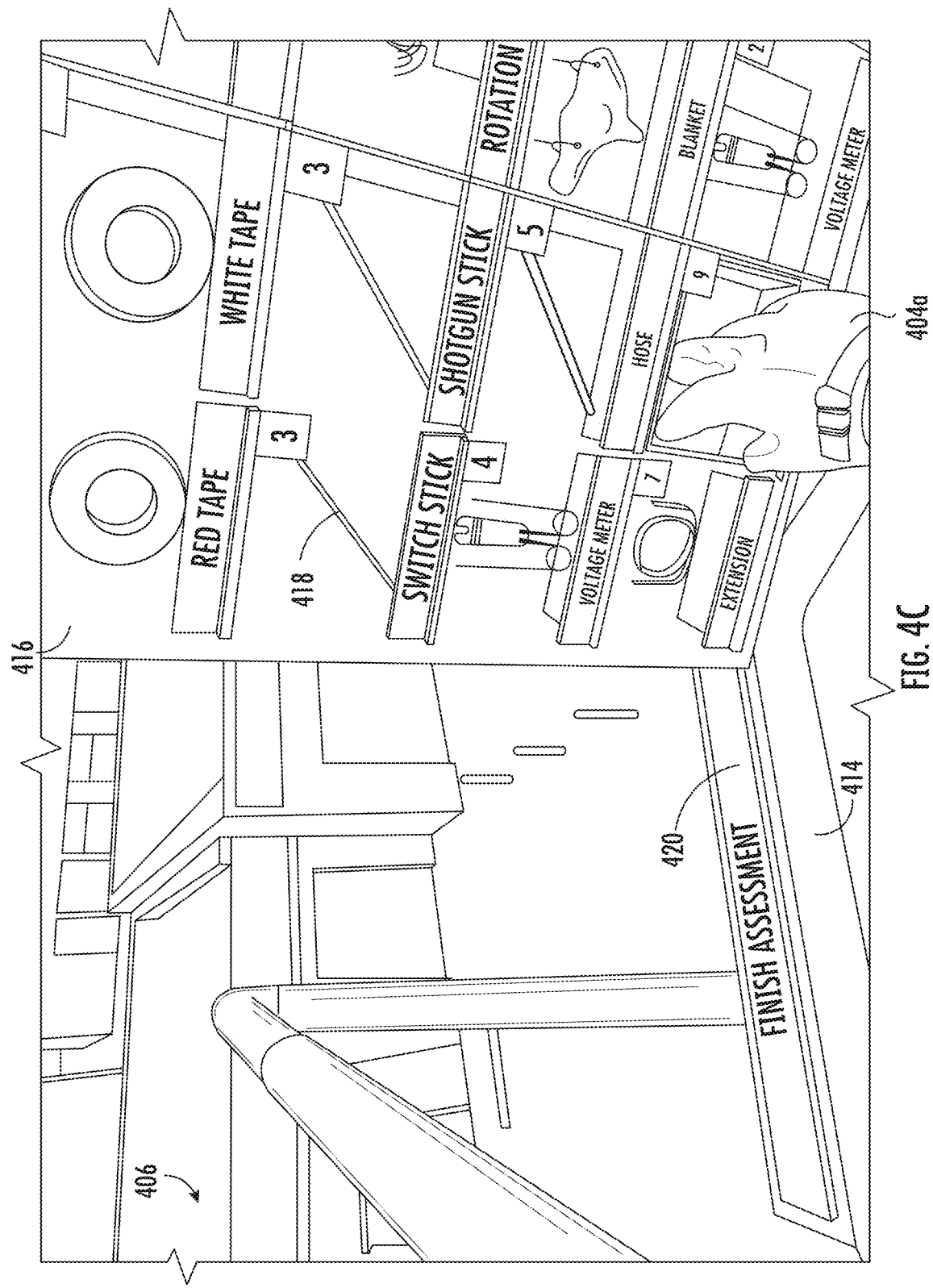

The system may render a second virtual environment based on the user's selection of an experience. As illustrated in FIG. 4B, upon user selection of the training experience, the system generates a second virtual environment 406 for providing a training experience for replacing a transformer bank. The second virtual environment 406 includes objects and scenery for the selected experience including a utility pole 408 and a bucket truck 410. In some embodiments, the system may present instructions for the experience to the user via a virtual guide 412.

Figure 4D:
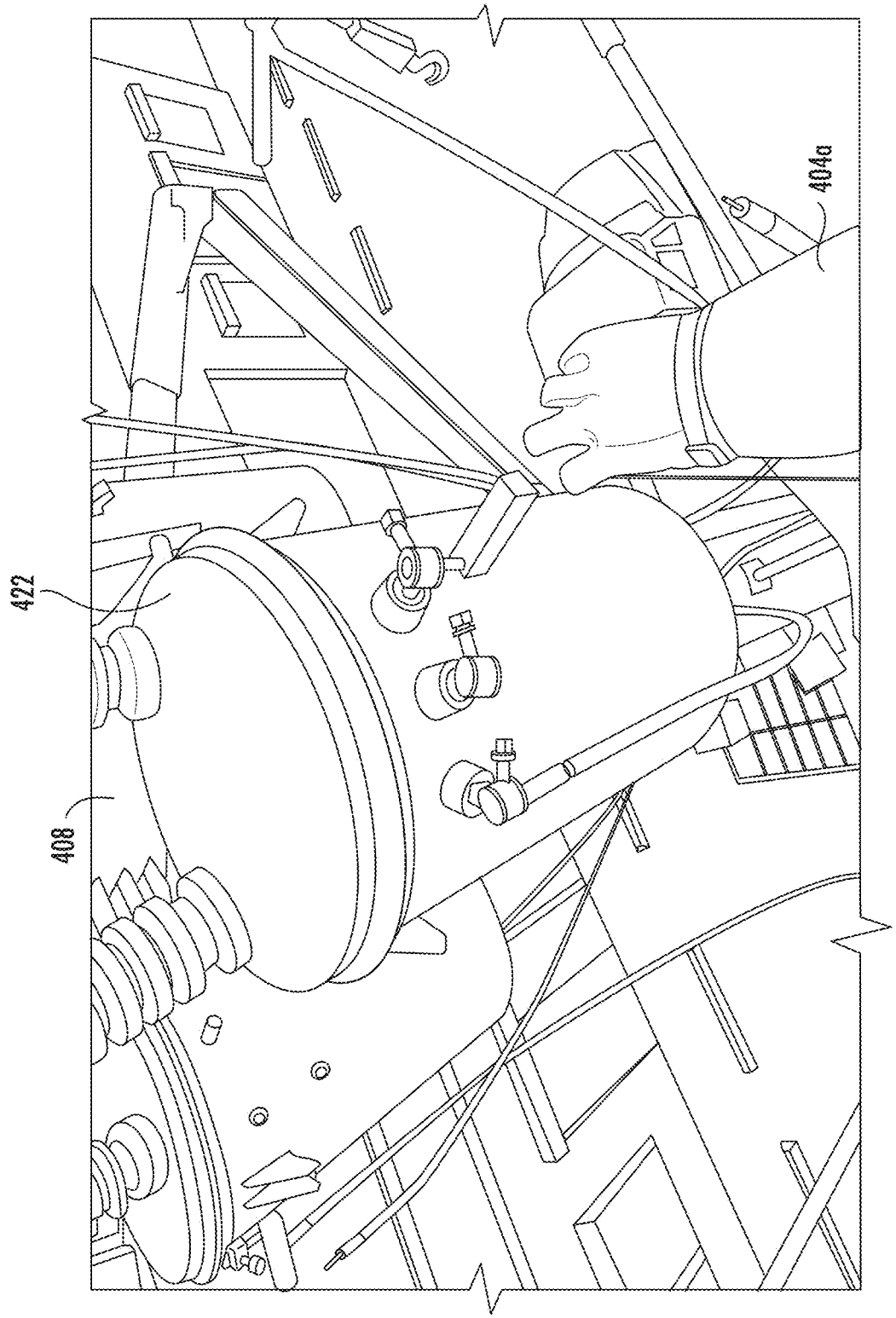
Figure 4E:
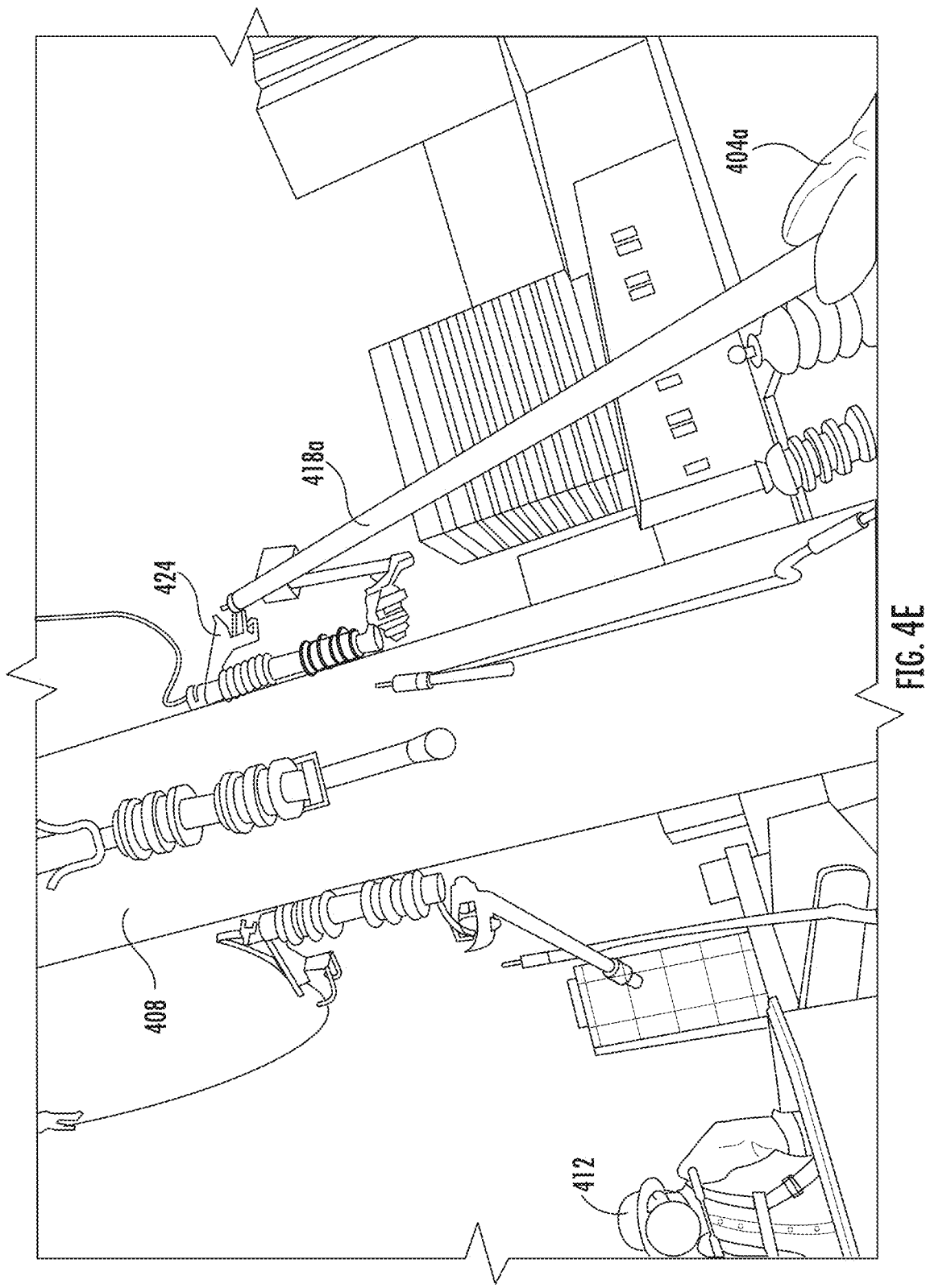

In some embodiments, the experience may present the user with one or more objects (e.g., tools and equipment) with which to interact with the virtual environment and complete tasks. In the illustrated embodiment of FIG. 4C, the second virtual environment 406 provides a virtual toolbox 416 for storing one or more tools 418 with which the user may use to interact with the second virtual environment 406. The user typically manipulates the objects (e.g., the tools 418) via the controllers 304a, 304b which represent the user's hands. In this way the VR system simulates the use of tools similar to an interaction in an actual environment and tools. In the illustrated embodiment, the user is positioned within a bucket 414 within the second virtual environment 406 in which the user may ascend to complete tasks on the utility pole 408. In some embodiments, the user selects a quantity of one or more tools or work implements from a provided inventory to place in the toolbox 416. The user may utilize the tools 418 and hands 404a, 404b to interact with the virtual environment and complete tasks and/or subtasks to complete the experience. For example, the user may interact with cable connections, bolts, screws, and other hardware of the transformer 422 and utility pole 408 as illustrated in FIG. 4D. As illustrated in FIG. 4E, in another example, the user may utilize a tool 418a to manipulate switches 424 to energize the transformer bank.

The user may indicate a completion of a task within the virtual environment to end the experience. In the illustrated embodiments, the second virtual environment 406 includes an interactive button 420 for indicating completion of the task. Upon user interaction with the button 420, the user is returned to the initial environment 400. As illustrated in FIG. 4F, the system then presents the user with a score 426 evaluating the user's completion of the task within the experience. This score 426 may relate to the extent to which the user's interaction with the second virtual environment 406 and completion of various subtasks complied with defined safety criteria. As illustrated in FIG. 4G, the system may further provide feedback to the user on incorrectly performed tasks. The user may interact with the presented evaluation to view additional information within the virtual environment 400. In some embodiments, the score 426 presented to the user is an initial score (e.g., an initial safety score), wherein a comprehensive evaluation is provided to the user at a later time outside of the virtual environment of the VR system.

FIG. 5 provides a high level process map for virtual reality training and evaluation, in accordance with one embodiment of the invention. As illustrated in block 502, the process 500 is initiated by first executing a virtual reality training program for a user on a virtual reality device such as the virtual reality simulation system 300 discussed with respect to FIG. 3. A VR training program or module may comprise a VR experience that provides a virtual environment, including virtual objects, tools and equipment) in which the user is prompted to perform one or more objectives, tasks, or the like might be actually performed by an individual, such as in a hazardous occupation (e.g., line working, construction, and the like). Such objective or tasks are typically predefined. In some embodiments, an assigned task within the VR training module may comprise a number of subtasks. In the previously discussed specific embodiment wherein the VR simulation system is configured to provide a line working experience to the user, an example of a line working task may be the replacement of a transformer bank. In order to successfully complete the transformer bank replacement task, the user may be expected to complete a number of subtasks within the provided virtual environment.

For example, subtasks for replacement of the transformer bank may include:

Covering system neutral properly;
Covering all phases properly;
Attaching the rotation leads in the correct order;
Recording rotation using echo protocol;
Properly checking voltage;
Recording voltage using echo protocol;
Properly opening all three cut out switches;
Using the voltage meter to make sure customer leads are de-energized;
Disconnecting customer leads from transformers;
Using red, white, and blue tape to mark rotation on customer leads;
Removing top side stingers from each phase;
Removing bottom side of all stingers;
Removing neutral harness;
Replacing transformers (by pressing button on bucket);
Connecting three neutral harness leads to transformer;
Connecting one neutral harness lead to system neutral;
Connecting bottom side of three stingers;
Connecting topside of three stingers;
Using echo protocol to report your intent to reenergize the transformers;
Energizing the transformer bank by re-engaging the fuses in the cut out switch;
Using the voltage meter to ensure 120/208 voltage;
Using Echo protocol to report voltage;
Using rotation meter to check rotation;
Using echo protocol to report rotation;
Opening up all three cut out switches;
Attaching customer leads;
Using echo protocol to report intent to reenergize transformer; and
Energizing the transformer bank by re-engaging the fuses in the cut out switch.

In another line working example, a task may relate to using a load break tool, and subtasks for use of a load break tool may include:

Covering system neutral properly;
Actuating the load break tool before disengaging first switch;
Attaching the load break tool to outermost part of horn on the first switch;
Disengaging first cut out switch;
Actuating the load break tool before disengaging second switch.
Attaching the load break tool to outermost part of horn on the second switch; and
Disengaging second cut out switch.

In yet another line working example, a task may relate to use of a mechanical jumper, and subtasks for use of a mechanical jumper may include:

Properly covering all phases, conductors, and disconnects;

Covering up in the correct order (1. neutral, 2. road, 3. middle, 4. field (optional));

Attaching macking T to correct phase;

Covering macking T with blanket;

Attaching at least one end of the mechanical jumper to macking T;

Cleaning phase before attaching first mechanical jumper end;

Covering first end of mechanical jumper after attaching;

Attaching first end of mechanical jumper to correct phase;

Using echo protocol when attaching the first end of the mechanical jumper;

Cleaning phase before attaching second end of the mechanical jumper;

Initiating echo protocol while attaching second end of phase;

Attaching second end of mechanical jumper to proper phase;

Removing the macking T after connecting the second end of the mechanical jumper to the phase; and Covering second end of phase with blanket.

In yet another line working example, a task may relate to crossarm replacement, and subtasks for crossarm replacement may include:

Covering the system neutral, roadside, middle, and field conductors;

Drilling a hole in the pole for the new crossarm;

Inserting a bolt through the back of the pole;

Mounting crossarm;

Measuring hole for crossarm braces by extending braces, then drilling a hole for them;

Inserting bolt through back of hole drilled for the crossarm braces;

Installing crossarm braces on the bolt;

Attaching the hot dolly to the road phase;

Removing the tie wire from pole top insulator;

Lifting the phase from the pole top insulator;

Placing a crossarm insulator on the newly installed crossarm;

Tying a rope from the old pole top insulator to the new pole top insulator;

Cutting partially through the old crossarm with a chainsaw;

Removing old crossarm portion that's dangling by a rope;

Covering the new crossarm and the remains of the old one with a blanket and covering the crossarm insulator with the split blanket;

Lifting phase with hands and place on crossarm insulator;

Securing phase to crossarm insulator with tie wire;

Moving hoses to make sure no part of phase is exposed;

Covering crossarm insulator with blanket;

Removing hot dolly from phase;

Attaching the hot dolly to the field phase;

Removing the tie wire from pole top insulator;

Lifting the field phase from the pole top insulator;

Placing a crossarm insulator on the newly installed crossarm;

Tying a rope from the old pole top insulator to the new pole top insulator;

Cutting partially through the old crossarm with a chainsaw;

Removing old crossarm portion that's dangling by a rope;

Covering the new crossarm and the remains of the old one with a blanket and covering the crossarm insulator with the split blanket;

Lifting phase with hands and placing on crossarm insulator;

Securing phase to crossarm insulator with tie wire;

Moving hoses to make sure no part of phase is exposed; and

Removing hot dolly from phase.

In yet another line working example, a task may relate to fanning out phases to make room for a reconductor, and related subtasks may include:

Covering up the system neutral, road phase, middle phase, and field phase along with all switches, etc.;

Attaching the arm extension to the crossarm on the road phase side;

Covering crossarm with a blanket;

Covering base of crossarm insulator with a split blanket;

Unwinding tie wire attaching phase to crossarm insulator;

Ensuring phase is still properly covered;

Moving phase to the crossarm extension;

Placing phase in the hanger closest to the end of the extension;

Covering the arm extension and phase with a rubber blanket;

Removing the blanket from the crossarm insulator on the road phase;

Removing the blanket from the pole top insulator on the middle phase;

Covering base of pole top insulator on middle phase with a split blanket;

Unwinding tie wire that holds the middle phase to the pole top conductor;

Moving phase to the crossarm extension; and

Placing phase in the hangar second from the one on the end.

In yet another line working example, a task may relate to gas pipe fusion, and related subtasks may include:

Cleaning the ends of the pipe to be fused;

Installing both ends of the pipe into the fusion machine;

Adjusting the pipe with the jaw adjusters to align pipes;

Checking the pipe's high-low;

Inserting facer between pipes and shave pipes;

Once finished shaving, checking high-low;

Checking temperature of the face heater with the infrared thermometer;

Before fusing pipe, cleaning the ends of both sides;

Cleaning the face heater;

Inserting face heater and closing the fusion machine against it;

Waiting for pipes to show the correct amount of beading;

Removing the face heater;

Closing fusion machine to meld pipes no later than 5 seconds after removing heater; and Documenting date time and name of person who did the fusion.

In yet another line working example, a task may relate to underground primary elbow installation, and related subtasks may include:

Placing ruler on conductor;

Measuring the proper length (12 inches) to cut the outside jacket of the primary conductor and mark with tape;

Cutting the primary conductor jacket at the marked point using the square cut;

Cutting the primary conductor jacket at the marked point using the spiral cut;

Measuring and copper shield 11 inches and marking with braid spring;

Using a crescent wrench to remove the copper shield;

Measuring and marking semi-con in preparation to remove 5.5 inches;
Cutting the semi-con using the square cut tool;
Cutting the semi-con using the spiral cut tool;
Measuring and marking insulation in preparation to remove 2 inches;
Cutting insulation with the insulation scoring tool;
Using a wire brush to clean the exposed conductor;
Using cable cleaning solvent to clean conductor wiping in a downward motion towards the transformer;
Installing the connector over the conductor;
Using the crimp tool to attach the connector to the conductor by crimping four times;
Cleaning connector with cable solvent again making sure to wipe in a downward motion towards the transformer;
Applying lubricant to the semi-con;
Placing elbow on conductor;
Cleaning probe with wire brush;
Cleaning probe with cleaning solvent;
Installing probe with elbow probe insert tool;
Cleaning probe with cable cleaning solvent;
Installing ground strap;
Covering ground strap with black electrical tape; and
Installing single static wire.

In yet another line working example, a task may relate to moving a deadened tap, and related subtasks may include:
Covering up the system neutral, road phase, middle phase, and field phase along with all switches, etc.;
Attaching the first false dead end/hoist assembly end to the top of the crossarm;
Using the hoist to remove the slack from the false dead end;
Attaching a new hoist to the dead end;
Ensuring that a bubble has been established between the dead end being removed and the first hoist;
Using echo protocol to inform spotter that you are about to cut the wire;
Using cable cutters cut the first phase;
Removing the second hoist;
Using the remaining hoist to create proper sag in the phase;
Properly measuring the two ends of the phase in preparation for fitting them into the quick connect;
Joining the phases with the quick connect;
Covering phase with hose and covering the top of the false dead end with a blanket;
Attaching the field false dead end/hoist assembly to the top of the crossarm;
Using the hoist to remove the slack from the false dead end;
Attaching a new hoist to the dead end;
Ensuring that a bubble has been established between the dead end being removed and the first hoist;
Using echo protocol to inform spotter that you are about to cut the wire;
Using cable cutters cut the second phase;
Removing the second hoist;
Using the remaining hoist to create proper sag in the phase;
Properly measuring the two ends of the phase in preparation for fitting them into the quick connect; and
Joining the phases with the quick connect.

In yet another line working example, a task may relate to proper cover up, and related subtasks may include:
Covering the system neutral first;
Covering the system neutral with four hoses and one blanket;
Covering the system neutral without gaps;
Covering all of the transformer before booming up to road phase;
Covering road phase without gaps;
Covering road phase with one blanket and four hoses;
Covering the middle phase without gaps;
Covering the middle phase with one blanket and four hoses;
Covering the field phase without gaps;
Covering the field phase with one blanket and four hoses; and
Covering the phases in the following order: road, middle, field.

In yet another line working example, a task may relate to removal of three phase jumpers, and related subtasks may include:
Covering the system neutral first;
Finishing completing proper cover up on jumpers, remaining gaps, etc.;
Finishing completing proper cover up in a safe order;
Hanging three flags on the correct phases on the pull off conductors to identify them;
Correctly identifying each conductor on the feeder and hanging corresponding flags;
After identifying the first two "matching" conductors, hanging a macking T and attaching one end of the mechanical jumper cable to it;
Covering the macking T with a blanket;
Cleaning the phase that you intend to apply the first end of the first mechanical jumper to;
Using echo protocol to announce intent to apply the first end of the first mechanical jumper;
Covering up the first end of the first mechanical jumper after applying it;
Cleaning the phase that you intend to apply the second end of the first mechanical jumper to;
Using echo protocol to announce intent to apply the second end of the first mechanical jumper;
Covering up the second end of the first mechanical jumper after applying it;
After identifying the second two "matching" conductors, hanging a macking T and attaching one end of the mechanical jumper cable to it;
Covering the macking T on the second phase with a blanket;
Cleaning the phase that you intend to apply the first end of the second mechanical jumper to;
Using echo protocol to announce intent to apply the first end of the second mechanical jumper;
Covering up the first end of the second mechanical jumper after applying it;
Cleaning the phase that you intend to apply the second end of the second mechanical jumper to;
Using echo protocol to announce intent to apply the second end of the second mechanical jumper;
Covering up the second end of the second mechanical jumper after applying it;
After identifying the third two "matching" conductors, hanging a macking T and attaching one end of the mechanical jumper cable to it;
Covering the macking T on the third phase with a blanket;
Cleaning the phase that you intend to apply the first end of the third mechanical jumper to;
Using echo protocol to announce intent to apply the first end of the third mechanical jumper;
Covering up the first end of the third mechanical jumper after applying it;

Cleaning the phase that you intend to apply the second end of the third mechanical jumper to;
Using echo protocol to announce intent to apply the second end of the third mechanical jumper;
Covering up the second end of the third mechanical jumper after applying it;
Using Echo protocol to announce intent to cut the first jumper;
Cutting the first end of the first jumper;
Cutting the second end of the first jumper;
Using Echo protocol to announce intent to cut the second jumper;
Cutting the first end of the second jumper;
Cutting the second end of the second jumper;
Using Echo protocol to announce intent to cut the third jumper;
Cutting the first end of the third jumper; and
Cutting the second end of the third jumper.

It should be understood that in other embodiments of the invention, experiences may be based on tasks not related to line working, but instead relate to other potentially hazardous or non-hazardous occupations and activities, which may include one or more subtasks.

In some embodiments, execution of a training program by a user may be prompted or triggered by one or more conditions as determined, for example, by the evaluation system 130 or an enterprise system 140. For example, conditions that may prompt an evaluation or training include hiring of a user, a promotion of a user to a new position, or declining performance of a user, wherein a user may require training or evaluation for new or existing responsibilities or tasks expected to be performed. In some embodiments, the evaluation system 130 or an enterprise system 140 may track one or more conditions for determining when a user is prompted to complete training or evaluation based on analysis of available user information (e.g., user training history). For example, a user may be prompted to perform regular or continuing training after a predetermined time period in order to maintain accreditation or certification or to remain in compliance with regulations. The system may automatically notify the user of a requested training program and schedule a training session with the user.

The VR simulation system 110 may include a plurality of executable VR training programs or modules configured to simulate/render a variety of virtual environments and objects and prompt a user to complete one or more tasks, and subtasks. In one embodiment, the user is prompted to select a specific VR training program to execute on the VR simulation system 110. In another embodiment, the VR simulation system 110 may automatically execute a specific VR training program based on an identity of the user. For example, a user may be identified as a new hire, and in response, the VR simulation system may execute an orientation or basic training program.

In some embodiments, prior to executing a VR training program, the user may be prompted to provide authentication information in order to accurately identify the user. In this way, the system is able to confirm an identity of the user and that the correct user is performing a training program or evaluation. Furthermore, the evaluation system 130 may use the user-provided authentication information to link the user's results and any collected data with a profile generated for the user. The user's performance results may be logged and stored by the evaluation system 130 to maintain a record of the user in a database for future reference.

As illustrated in block 504 of FIG. 5, the system monitors user interactions within the virtual environment for the duration of the training program, typically in order to determine whether the user has completed a task (and related subtasks) in accordance with defined criteria (e.g., safety, efficiency, and/or step process criteria). User interactions typically include user performance or completion of tasks or subtasks related to a training program. In some embodiments, user interactions may further include any actions performed or inactions (i.e., actions not performed) by the user with the virtual environment, whether related or unrelated to completion of a task or subtask within the VR training program. For example, the system may monitor and record any actions performed by the user that are construed as supplemental, redundant, or non-essential to completion of an assigned task. The system may record performed user interactions as events, wherein recorded event data may be used to populate a log comprising the user interactions performed during the training program.

In some embodiments, user interactions further include user interaction, use, or contact with virtual objects populating the virtual environment. For example, the system may track use of virtual tools provided to the user within the virtual environment. In another example, the system may track user contact with virtual objects, particular objects that may be defined as hazardous, in the virtual environment (e.g., a live power line). The system may further log the non-use or lack of interaction with a virtual object by the user. For example, the user may forget to use a particular provided tool or unnecessarily use multiple tools to complete a task when another single tool could have been instead used to complete the same task in a more efficient manner. In some embodiments, the evaluation system may monitor and track user interactions (e.g., interactions that relate to completion of various subtasks) and lack of interactions in order to assist in determining safety, step process, and/or efficiency scores as discussed herein.

In some embodiments, all user interactions are monitored in real-time by the VR simulation system and/or evaluation system 130 and logged within a database. In one embodiment, the VR training and evaluation system is automated, wherein no additional user (i.e., a supervisor or trainer) is required to be present to execute a VR training program and evaluation process.

As illustrated in block 506 of FIG. 5, the system generates a user performance evaluation based on the user interactions monitored and recorded during the training program. The evaluation system 130 compares the recorded user interactions against predefined criteria or a scoring rubric representing a preferred completion of a task associated with a training program. In some embodiments, the predefined criteria may include safety criteria, step-process criteria, and/or efficiency criteria. The predefined criteria is used to generate the safety score 602, step-process score 604, and the efficiency score 606 components of the user evaluation 600 as illustrated in FIG. 6.

The user interactions with the virtual environment during the virtual training program may be evaluated according to the safety criteria in order to determine a safety evaluation for the user's completion of a task. The evaluation system may determine whether each subtask has been correctly completed by the user during the virtual training program, and the user may only receive credit for completing a subtask if such subtask is performed correctly. In some embodiments, if a subtask is not performed correctly, the user may receive no credit towards a safety evaluation score. Credit that a user may receive for completing various subtasks may then be combined as part of an overall safety evaluation for a particular task. The safety criteria may include a safety level for each subtask indicating a level of hazard and/or importance associated with the subtask, wherein a more hazardous or important task has a greater weighted importance on the safety evaluation than a less hazardous and/or important task. Credit for a completed subtask may be based on such subtask's weighted importance.

For example, a user may complete a first subtask having a safety level score weighting factor of 3 and a second subtask having a safety level score weighting factor of 10, wherein the user completes the first subtask correctly and the second subtask incorrectly. The user gains 1 point for completing the first subtask correctly which is multiplied by a factor of 3. Additionally, the user gains 0 points for completing the second subtask incorrectly which is multiplied by a factor of 10. As a result the user gains a total of 3 points towards a safety evaluation score for completion of the first and second subtasks.

In one embodiment, the safety evaluation is a cumulative score that is calculated over the course of the completion of a task, wherein the cumulative score is required to surpass a predetermined threshold score in order for the user to have a passing safety evaluation. In another embodiment, the safety evaluation is calculated as a percentage of a total possible number of points available for the user to earn during a completion of a task, wherein incorrect completion of a task reduces the user's calculated percentage score.

Below is a table providing score weighting for a plurality of subtasks associated with the task of replacing a transformer bank. A weighted score may be awarded to a user based on successful completion of the subtask by the user. In this regard, the user may gain 1 point multiplied by the weighting score for each correctly completed subtask, and 0 points multiplied by the weighting score for each subtask that is not correctly completed. A total safety score may then be equal to the total number of points that the user received divided by the maximum possible number of points. The total safety score may be represented as a percentage of such maximum possible number of points that the user receives.

TABLE 1

Score Weighting for Replacement of a Transformer Bank

| Subtask | Score Weight |
|---|---|
| Covered system neutral properly | 2 |
| Covered all phases properly | 10 |
| Attach the rotation leads in the correct order | 8 |
| Record rotation using echo protocol | 6 |
| Properly check voltage | 8 |
| Record voltage using echo protocol | 4 |
| Properly open all three cut out switches | 6 |
| Use the voltage meter to make sure customer leads are deenergized | 10 |
| Disconnect customer leads from transformers | 8 |
| Use red, white, and blue tape to mark rotation on customer leads | 6 |
| Remove top side stingers from each phase | 10 |
| Remove bottom side of all stingers | 6 |
| Remove neutral harness | 6 |
| Replace transformers (by pressing button on bucket) | 6 |
| Connect three neutral harness leads to transformer | 6 |
| Connect one neutral harness lead to system neutral | 6 |
| Connect bottom side of three stingers | 6 |
| Connect topside of three stingers | 6 |
| Use echo protocol to report your intent to reenergize the transformers | 8 |
| Energize the transformer bank by re-engaging the fuses in the cut out switch | 4 |
| Use the voltage meter to ensure 120/208 voltage | 8 |

TABLE 1-continued

Score Weighting for Replacement of a Transformer Bank

| Subtask | Score Weight |
|---|---|
| Use Echo protocol to report voltage | 4 |
| Use rotation meter to check rotation | 8 |
| Use echo protocol to report rotation | 8 |
| Open up all three cut out switches | 10 |
| Attach customer leads | 8 |
| Use echo protocol to report intent to reenergize transformer | 6 |
| Energize the transformer bank by re-engaging the fuses in the cut out switch | 6 |

In some embodiments, the safety criteria may define one or more user interactions that when performed by the user, automatically trigger a failure of the task. In some embodiments, the failure may be immediate and interrupt the task and/or the virtual training program. For example, in a line working experience, the user may contact an uninsulated conductor triggering an immediate failure of the task as user contact with the conductor may prove deadly in an actual environment.

The user interactions may further be compared to the step-process criteria to determine a step-process evaluation for the user's completion of a task or subtask. The step-process criteria may define a preferred or recommended order in which the subtasks of the assigned task should be completed by the user. By comparing the user interactions during the training program to the step-process criteria, the evaluation system 130 may calculate a step-process evaluation, wherein the number or order of subtasks successfully completed by the user may be scored. In some embodiments, subtasks may be weighted by criticality for successfully completing the task, wherein a subtask with a high criticality may be essential for successful completion while a subtask with a low criticality may have a minor impact if at all and not severely impact the outcome of the task. The user may be penalized a predetermined amount for each step performed different than defined by the preferred sequence of steps based on the criticality. In some embodiments, the evaluation system 130 may penalize a user score by a predetermined number of points (e.g., 20 percentage points) for performing one or more incorrect interactions predefined by the experience. For example, a user interacting with a line working virtual training program may accidentally maneuver a bucket into a utility pole resulting in a collision for which the user's score may be penalized by a predetermined amount. In one embodiment, the step-process evaluation is calculated together and as a part of the safety evaluation as incorrect sequencing of steps may be potentially hazardous.

In some embodiments, the step-process evaluation may evaluate a user based on a number of completed subtasks in comparison to a number of required subtasks defined by the step-process criteria. In some embodiments, the step-process evaluation score may be calculated and presented as a percentage of the required subtasks that were completed by the user during the experience.

In some embodiments, the step-process evaluation may further evaluate a user based on an amount of time required to complete individual tasks and/or subtasks by comparing an individual task and/or subtask completion time to a preferred completion time. In one embodiment, the evaluation system may present a user with a total time for completing a task while separately presenting an itemized list of completion times for individual subtasks within the larger task. The evaluation system may further notify the user if any subtasks took too long to complete (e.g., as compared to a defined amount of time specified in the step-process criteria).

The user interactions may also be compared to the efficiency criteria to determine an efficiency evaluation for the user's completion of a task or subtask. In one embodiment, the efficiency criteria may include a preferred completion time of one or more of the tasks or subtasks. The user's progress within a task may be timed, wherein the completion of the task or subtasks by the user may be time stamped and compared to the preferred time stamp completion times stored in the efficiency criteria. In this way, the evaluation system 130 may determine actions taken by the user exceed the preferred completion time by a predetermined amount and which may require improvement and/or additional training. In one embodiment, the evaluation system 130 may generate an efficiency evaluation that details an amount of time for a task or individual subtasks that exceeded the preferred completion times (i.e., delay).

In some embodiments, the efficiency evaluation may identify actions performed by the user that are determined to be improperly sequenced, supplemental, redundant, nonessential, or the like to completion of an assigned task or subtask and may cause delay. For example, the user may select the incorrect tool for a task, wherein completion of the task is delayed due to the selection. As an improper sequencing of user actions may result in a delay, in one embodiment, the efficiency evaluation and the step-process evaluation are determined or calculated simultaneously as either a single score or a separate scores.

In a specific example, the duration of time required to complete a task (i.e., the virtual training program) and/or subtask by the user may be tracked from start to finish by the evaluation system 130. The evaluation system 130 may define predetermined time parameters $t_1$ and $t_2$ for evaluating user performance, wherein $t_1 < t_2$. If the duration of time, t, required to complete the task and/or subtask is less than the first predetermined time $t_1$, then an efficiency score of 100% is assigned to the user for that task and/or subtask. If the duration t is greater than a second predetermined time $t_2$, then an efficiency score of 0% is assigned. If the duration t is between $t_1$ and $t_2$ (i.e., $t_1 < t < t_2$), then a weighted score reduction is applied to the efficiency score based on the amount that the duration t exceeds $t_1$. In one embodiment, weighted score reduction may be applied linearly based on the predetermined time parameters. For example, if $t_1$ is 1 min, $t_2$ is 2 min, and t is 1.5 min, a score reduction of 50% may be applied to the efficiency score. It should be understood that other weighting models may be used to calculate scores. In some embodiments, time parameters may be defined manually during generation of the virtual training program experience. In other embodiments, the time parameters may be calculated statistically based on recorded durations of the user and/or other users stored in the database.

In some embodiments, the evaluation system 130 may be used for certification and accreditation of skilled users (e.g., line men), wherein the system assigns classifications based on the results of the evaluation. In some embodiments, the predefined criteria used to evaluate the users may vary depending on the user. In one example, a first line man (i.e., a user) having a higher classification than a second line man may be evaluated with stricter predefined criteria than the second line man wherein, for example, an evaluation passage threshold may be higher for the first line man.

As illustrated in block 508 of FIG. 5, the system presents the calculated results of the user performance evaluation to the user upon completion of the training program. In some embodiments, the scores of the user evaluation are calculated in real-time as the user interacts with the virtual environment by the evaluation system 130, and the user receives immediate scoring and feedback after completion of the training program. In one embodiment, the system immediately presents the user with an initial safety evaluation, and subsequently (e.g., within a few hours or days) a detailed report including a safety evaluation, step-process evaluation, and/or efficiency evaluation may be generated and provided to the user.

As illustrated in block 510 of FIG. 5, the system utilizes the evaluation results for enterprise task assignment and scheduling. In some embodiments, the enterprise system 140 collects completed evaluation information and data from the evaluation system 130 and generates a user database to provide an aggregated view of the integrated user base and associated evaluation information, scores, certifications, accreditations, and the like. In one embodiment, the user database may be used to compare user based on the stored evaluation information. For example, users may be compared to one another based on evaluation scores, experience, skill level, accreditation level, geographic location, and the like. In a specific example, the user database may be used to search for all users within a particular region with five or more years of experience and having a particular certification level who also specialize in working on electrical poles.

In another embodiment, the user database may be employed by an entity (e.g., a business) to assign appropriately skilled workers to specific tasks. In some embodiments, the evaluation system 130 may be integrated into an enterprise system such as an electronic scheduling system for organizing work orders and workforce resources.

In another embodiment, the VR simulation system 110 and/or the evaluation system 130 may be configured to evaluate multiple users using multiple VR devices (e.g., each user having an associated HMD) at the same time. The multiple users may be simultaneously trained through interaction with a virtual environment in real time. In one embodiment, the system may train and evaluate users in the same virtual environment, wherein the system is configured to provide cooperative user interaction with a shared virtual environment generated by the VR simulation system 110. The multiple users within the shared virtual environment may be able to view one another and each other's actions within the virtual environment. The VR simulation system 110 may be configured to provide means for allowing communication between the multiple users (e.g., microphone headset or the like). Individual users may be evaluated individually and/or in conjunction with one or more other users (e.g., a team score) by the evaluation system 130 as previously described herein.

In a specific example, the VR simulation system 110 may provide a shared virtual environment comprising a line working training simulation for two workers maintaining or repairing the same transformer bank or the like. The two workers may each be provided with separate locations (e.g., bucket locations) within the shared virtual environment or, alternatively, a shared space or location simulating an actual line working environment. In another specific example, only a first worker may be positioned at a bucket location, while a second worker is positioned in a separate location such as located on the ground below the bucket within the shared virtual environment.

In another specific example, a first user may be positioned at a bucket location while a second user may be positioned as a qualified observer within the same virtual environment, for example, on the ground below the bucket within the shared virtual environment. The evaluation system 130 may be configured to evaluate both the first user performing simulated line work and the second user performing the role of the qualified observer simultaneously while providing separate and/or combined evaluation scores for the users. Examples of evaluated qualified observer tasks and/or subtasks may include establishing and maintaining proper equipment and personnel clearances (e.g., approach distances), ensuring proper use of personal protective equipment, installing cover-up, identifying voltages, identifying energized components, communicating information to other users (e.g., instructions for other tasks and/or subtasks), and other tasks and/or subtasks related to maintaining safe or proper work practices by users.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with virtual reality user training and evaluation.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A virtual reality training and evaluation system, comprising:

a visual display device;
one or more user input devices;
one or more computer processors;
a memory;
a network communication device; and
computer-executable instructions stored in the memory, executable by the one or more computer processors, and configured to cause the one or more computer processors to perform the steps of:
  executing a virtual reality training module, wherein the virtual reality training module is configured to simulate a virtual environment, wherein simulating the virtual environment comprises displaying at least a portion of the virtual environment on the visual display device and receiving user interactions with the virtual environment via the one or more user input devices, wherein the virtual environment is a virtual electrical line working environment;
  during execution of the virtual reality training module, prompting a user to perform a task in the virtual environment, wherein the task is an electrical line working task, wherein the task is selected from a group consisting of replacement of a transformer bank, use of a load break tool, use of a mechanical jumper, crossarm replacement, fanning out phases to make room for a reconductor, underground primary elbow installation, moving a deadened tap, proper cover up, and removal of three phase jumpers;
  during performance of the task, monitoring the user interactions with the virtual environment;
  comparing the user interactions with predefined safety criteria, wherein comparing the user interactions with the predefined safety criteria comprises determining whether the user has completed one or more subtasks associated with the task, wherein each of the one or more subtasks is associated with a safety level;
  computing a safety score based on the safety level for each of the one or more subtasks and whether the user has completed each of the one or more subtasks;
  determining whether the user has passed a safety evaluation based on the computed safety score; and
  providing the user with the safety evaluation.

2. The virtual reality training and evaluation system according to claim 1, wherein the computer-executable instructions are configured to cause the one or more computer processors to perform the steps of:
  based on monitoring the user interactions with the virtual environment, comparing the user interactions with predefined efficiency criteria; and
  based on comparing the user interactions with the predefined efficiency criteria, providing the user with an efficiency evaluation.

3. The virtual reality training and evaluation system according to claim 2, wherein:
  monitoring the user interactions with the virtual environment comprises recording event data for a plurality of user interaction events; and
  the efficiency evaluation is further based on an order and timing of the user interaction events.

4. The virtual reality training and evaluation system according to claim 1, wherein the computer-executable instructions are configured to cause the one or more computer processors to perform the steps of:
  based on monitoring the user interactions with the virtual environment, comparing the user interactions with predefined step-process criteria; and
  based on comparing the user interactions with the predefined step-process criteria, providing the user with a step-process evaluation.

5. The virtual reality training and evaluation system according to claim 4, wherein:
  monitoring the user interactions with the virtual environment comprises recording event data for a plurality of user interaction events; and
  the step-process evaluation is further based on an order of the user interaction events.

6. The virtual reality training and evaluation system according to claim 1, wherein the computer-executable instructions are configured to cause the one or more computer processors to perform the step of tracking use of virtual tools provided to the user within the virtual environment, wherein the virtual tools are stored in a virtual toolbox within the virtual environment, wherein the virtual tools comprise at least one tool selected from a group consisting of a cable connection, load break tool, square cut tool, spiral cut tool, crimp tool, insulation scoring tool, elbow probe insert tool, and a tool to manipulate switches, wherein computing the safety score is further based on tracking the use of the virtual tools by the user, wherein tracking the use of the virtual tools by the user comprises detecting that the user has failed to use the at least one tool or has unnecessarily used multiple tools of the virtual tools.

7. The virtual reality training and evaluation system according to claim 1, wherein comparing the user interactions with the predefined safety criteria comprises determining that the user has not completed a first subtask associated with the task in accordance with the predefined safety criteria, and wherein providing the user with the safety evaluation comprises notifying the user that the first subtask was not completed in accordance with the predefined safety criteria.

8. The virtual reality training and evaluation system according to claim 1, wherein the virtual environment is a virtual hazardous environment.

9. The virtual reality training and evaluation system according to claim 1, wherein the user is a first user, and the virtual environment is a shared virtual environment further comprising a second user, wherein the computer-executable instructions are configured to cause the one or more computer processors to perform the steps of:
  displaying the shared virtual environment to the first user and the second user;
  simultaneously monitoring interactions of the first user and the second user with the shared virtual environment; and
  comparing the interactions of the first user and the second user with the predefined safety criteria.

10. The virtual reality training and evaluation system according to claim 9, wherein the second user is a qualified observer for the first user.

11. A computer-implemented method for virtual reality training and evaluation, the computer-implemented method comprising the steps of:
  executing a virtual reality training module, wherein the virtual reality training module is configured to simulate a virtual environment, wherein simulating the virtual environment comprises displaying at least a portion of the virtual environment on a visual display device and receiving user interactions with the virtual environment via one or more user input devices, wherein the virtual environment is a virtual electrical line working environment;

during execution of the virtual reality training module, prompting a user to perform a task in the virtual environment, wherein the task is an electrical line working task;

during performance of the task, monitoring the user interactions with the virtual environment;

comparing the user interactions with predefined safety criteria, wherein comparing the user interactions with the predefined safety criteria comprises determining whether the user has completed one or more subtasks associated with the task, wherein each of the one or more subtasks is associated with a safety level computing a safety score based on the safety level for each of the one or more subtasks and whether the user has completed each of the one or more subtasks;

determining whether the user has passed a safety evaluation based on the computed safety score; and providing the user with the safety evaluation.

12. The computer-implemented method according to claim 11 further comprising the steps of:

based on monitoring the user interactions with the virtual environment, comparing the user interactions with predefined efficiency criteria; and based on comparing the user interactions with the predefined efficiency criteria, providing the user with an efficiency evaluation.

13. The computer-implemented method according to claim 12, wherein:

monitoring the user interactions with the virtual environment comprises recording event data for a plurality of user interaction events; and the efficiency evaluation is further based on an order and timing of the user interaction events.

14. The computer-implemented method according to claim 11, further comprising the steps of:

based on monitoring the user interactions with the virtual environment, comparing the user interactions with predefined step-process criteria; and based on comparing the user interactions with the predefined step-process criteria, providing the user with a step-process evaluation.

15. The computer-implemented method according to claim 14, wherein:

monitoring the user interactions with the virtual environment comprises recording event data for a plurality of user interaction events; and the step-process evaluation is further based on an order of the user interaction events.

16. The computer-implemented method according to claim 11, wherein the task is selected from a group consisting of replacement of a transformer bank, use of a load break tool, use of a mechanical jumper, crossarm replacement, fanning out phases to make room for a reconductor, underground primary elbow installation, moving a deadened tap, proper cover up, and removal of three phase jumpers.

17. The computer-implemented method according to claim 11, wherein the user is a first user, and the virtual environment is a shared virtual environment further comprising a second user, the computer-implemented method further comprising the steps of:

displaying the shared virtual environment to the first user and the second user;

simultaneously monitoring interactions of the first user and the second user with the shared virtual environment; and comparing the interactions of the first user and the second user with the predefined safety criteria.

18. The computer-implemented method according to claim 11, wherein the computer-implemented method further comprises the step of tracking use of virtual tools provided to the user within the virtual environment, wherein the virtual tools are stored in a virtual toolbox within the virtual environment, wherein the virtual tools comprise at least one tool selected from a group consisting of a cable connection, load break tool, square cut tool, spiral cut tool, crimp tool, insulation scoring tool, elbow probe insert tool, and a tool to manipulate switches, wherein computing the safety score is further based on tracking the use of the virtual tools by the user, wherein tracking the use of the virtual tools by the user comprises detecting that the user has failed to use the at least one tool or has unnecessarily used multiple tools of the virtual tools.

19. A virtual reality training and evaluation system, comprising:

a visual display device;

one or more user input devices;

one or more computer processors;

a memory;

a network communication device; and computer-executable instructions stored in the memory, executable by the one or more computer processors, and configured to cause the one or more computer processors to perform the steps of:

executing a virtual reality training module, wherein the virtual reality training module is configured to simulate a virtual environment, wherein simulating the virtual environment comprises displaying at least a portion of the virtual environment on a visual display device and receiving user interactions with the virtual environment via one or more user input devices, wherein the virtual environment is a virtual electrical line working environment;

during execution of the virtual reality training module, prompting a user to perform a task in the virtual environment, wherein the task is an electrical line working task;

during performance of the task, monitoring the user interactions with the virtual environment;

comparing the user interactions with predefined safety criteria, wherein comparing the user interactions with the predefined safety criteria comprises determining whether the user has completed one or more subtasks associated with the task, wherein each of the one or more subtasks is associated with a safety level computing a safety score based on the safety level for each of the one or more subtasks and whether the user has completed each of the one or more subtasks;

determining whether the user has passed a safety evaluation based on the computed safety score; and providing the user with the safety evaluation.

20. The system according to claim 19, wherein the computer-executable instructions are configured to cause the one or more computer processors to perform the step of tracking use of virtual tools provided to the user within the virtual environment, wherein the virtual tools are stored in a virtual toolbox within the virtual environment, wherein the virtual tools comprise at least one tool selected from a group consisting of a cable connection, load break tool, square cut tool, spiral cut tool, crimp tool, insulation scoring tool, elbow probe insert tool, and a tool to manipulate switches, wherein computing the safety score is further based on tracking the use of the virtual tools by the user, wherein tracking the use of the virtual tools by the user comprises detecting that the user has failed to use the at least one tool or has unnecessarily used multiple tools of the virtual tools.

\* \* \* \* \*